(12) United States Patent
Padgette

(10) Patent No.: US 7,624,069 B2
(45) Date of Patent: Nov. 24, 2009

(54) METHOD AND SYSTEM FOR SELECTING BETWEEN OR ALLOCATING AMONG ALTERNATIVES

(75) Inventor: Robert L. Padgette, Raleigh, NC (US)

(73) Assignee: Klein Decisions, Inc., Research Triangle Park, NC (US)

(*) Notice: Subject to any disclaimer, the term of this patent is extended or adjusted under 35 U.S.C. 154(b) by 817 days.

(21) Appl. No.: 10/771,709

(22) Filed: Feb. 4, 2004

(65) Prior Publication Data

US 2004/0172357 A1 Sep. 2, 2004

Related U.S. Application Data

(63) Continuation-in-part of application No. PCT/US03/32381, filed on Oct. 10, 2003.

(60) Provisional application No. 60/417,857, filed on Oct. 11, 2002.

(51) Int. Cl.
G06Q 40/00 (2006.01)
(52) U.S. Cl. .......................... 705/39; 705/35
(58) Field of Classification Search .............. 705/10–44
See application file for complete search history.

(56) References Cited

U.S. PATENT DOCUMENTS

| | | |
|---|---|---|
| 5,999,918 A | 12/1999 | Williams et al. |
| 6,012,044 A | 1/2000 | Maggioncalda et al. |
| 6,064,984 A | 5/2000 | Ferguson et al. |
| 6,085,175 A | 7/2000 | Gugel et al. |
| 6,219,650 B1 | 4/2001 | Friend et al. |
| 6,275,814 B1 | 8/2001 | Giansante et al. |
| 6,282,520 B1 | 8/2001 | Schirripa |
| 6,292,787 B1 | 9/2001 | Scott et al. |
| 6,313,833 B1 | 11/2001 | Knight |
| 6,336,102 B1 | 1/2002 | Luskin et al. |
| 6,397,212 B1 | 5/2002 | Biffar |
| 6,405,179 B1 | 6/2002 | Rebane |
| 6,430,542 B1 | 8/2002 | Moran |
| 6,484,152 B1 | 11/2002 | Robinson |
| 6,801,199 B1 * | 10/2004 | Wallman .................... 345/440 |
| 7,177,831 B1 * | 2/2007 | O'Shaughnessy et al. . 705/36 R |
| 2001/0021911 A1 | 9/2001 | Ohmoto et al. |
| 2001/0027437 A1 | 10/2001 | Turbeville et al. |
| 2001/0042036 A1 | 11/2001 | Sanders |
| 2001/0056391 A1 | 12/2001 | Schultz |

(Continued)

OTHER PUBLICATIONS

International Search report on corresponding PCT application, Serial No. PCT/US03/32381, international filing date Oct. 10, 2003.

(Continued)

*Primary Examiner*—Frantzy Poinvil
(74) *Attorney, Agent, or Firm*—Nelson Mullins Riley & Scarborough, LLP

(57) ABSTRACT

A method and system for selecting between or allocating among a plurality of alternatives is disclosed. The method for selecting between or allocating among the plurality of alternatives may include determining a risk tolerance for a user. A plurality of attributes related to the alternatives may be presented for selection by the user. At least one of ranking the alternatives or allocating among the alternatives may be performed in response to analysis of the plurality of attributes and the risk tolerance of the user.

31 Claims, 33 Drawing Sheets

U.S. PATENT DOCUMENTS

| | | |
|---|---|---|
| 2002/0002521 A1 | 1/2002 | Shearer et al. |
| 2002/0042764 A1 | 4/2002 | Gardner et al. |
| 2002/0062271 A1 | 5/2002 | Breuninger |
| 2002/0062272 A1 | 5/2002 | Kim et al. |
| 2002/0087388 A1 | 7/2002 | Keil et al. |
| 2002/0091604 A1 | 7/2002 | Loeper |
| 2002/0091605 A1 | 7/2002 | Labe, Jr. et al. |
| 2002/0107770 A1 | 8/2002 | Meyer et al. |
| 2002/0111890 A1 | 8/2002 | Sloan et al. |

OTHER PUBLICATIONS

U.S. Appl. No. 09/704,349, filed Nov. 1, 2000, Johnston et al.
A Sensible Mutual Fund Selection Model, by Hakan Saraoglu and Miranda Lam Detzler, pp. 60-72 (2002).

* cited by examiner

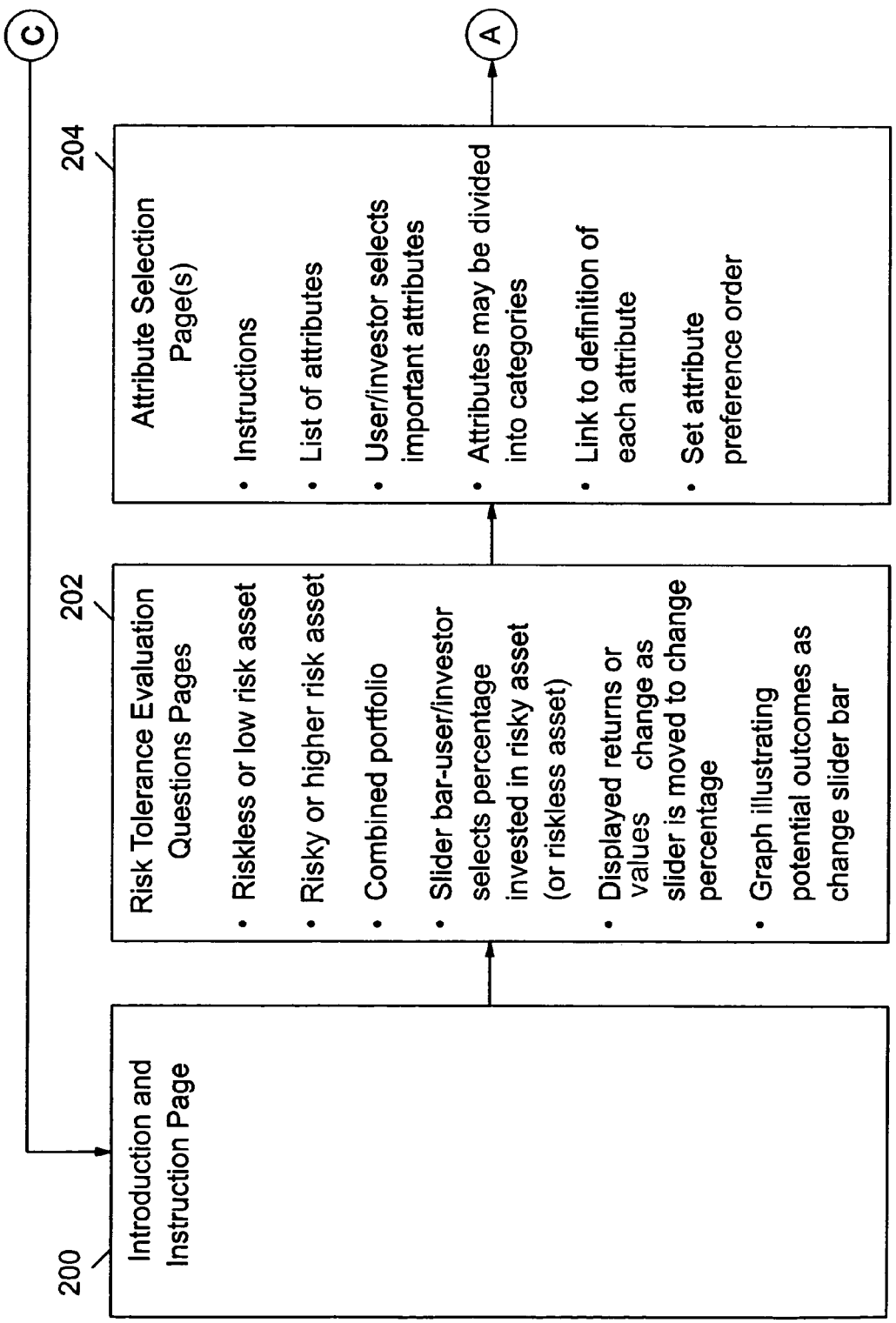

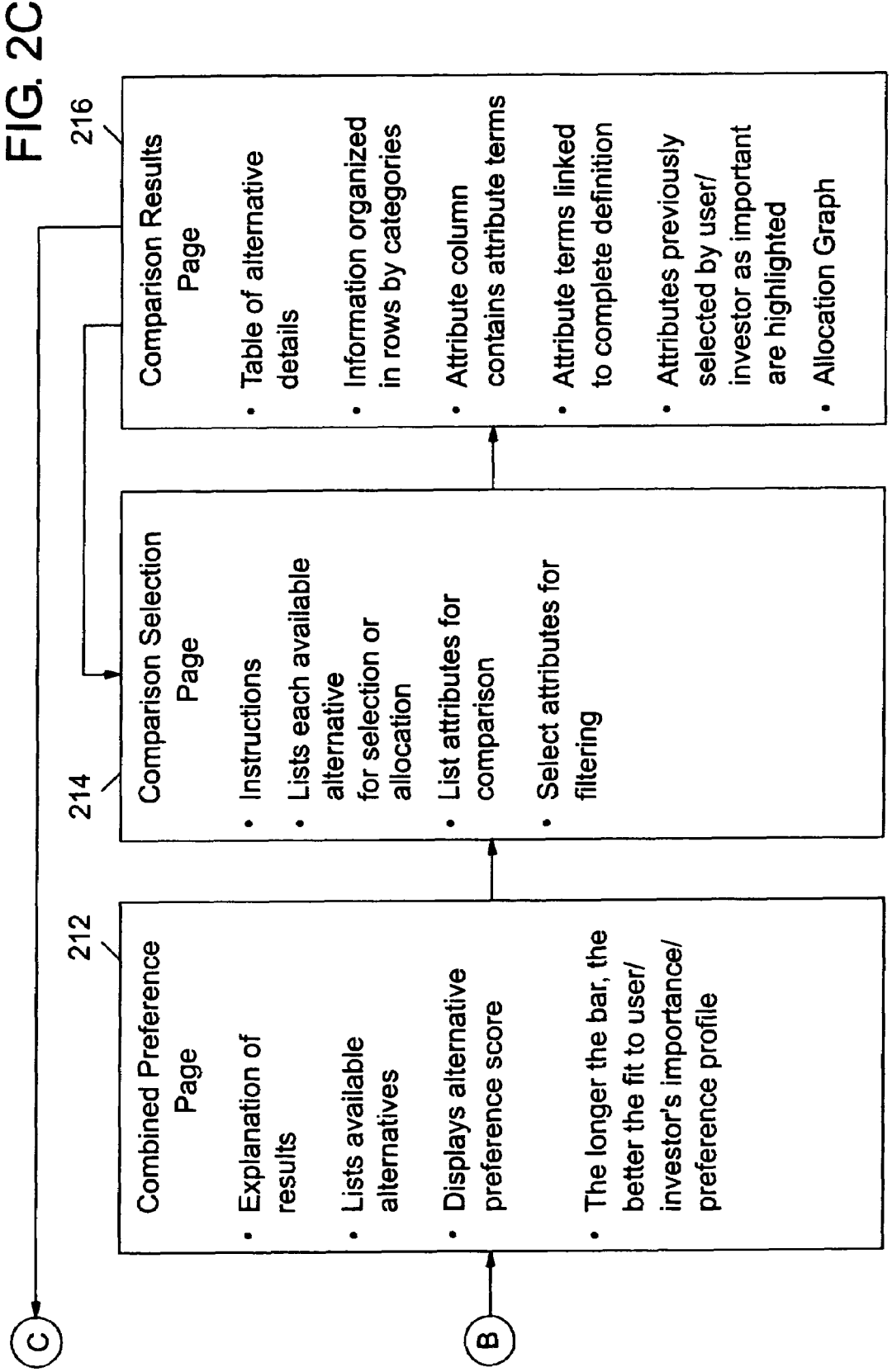

FIG. 3

Product Decision Tool
_____

Step 1: Determine Your Risk Tolerance

The first step of the Product Decision tool is to determine your personal risk tolerance. You will be asked to allocate your investment resources between two hypothetical assets. The riskless asset has a known return and the risky asset has a variable return.

Using the slider, allocate your resources between the two options. (To move the slider, click on it with your left mouse button and move the mouse left or right.) As you change your allocation, the chart of future potential returns and values below the slider will adjust.

A series of the risk tolerance questions, each with a different set of asset choices, will be presented to you. When you are satisfied with your allocation for one risk tolerance question, click on "next" and you will see the next pairing for your allocation choice.

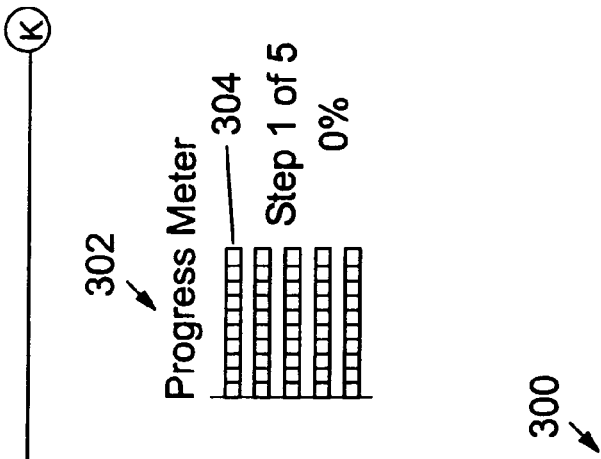

Progress Meter — 304
Step 1 of 5
0%

| FIG. 5A-1 |
|---|
| FIG. 5A-2 |

Step 1: Determine Your Risk Tolerance

The first step of the Product Decision tool is to determine your personal risk tolerance. You will be asked to allocate your investment resources between a conservative and an aggressive asset. A series of these risk tolerance questions is asked (up to 10 with different conservative and aggressive assumptions) to ensure consistency and enhance the quality of the results.

Instructions:
Using the slider, allocate your resources between the two options. (To move the slider, click on the arrows on either end or click on the slider with your left mouse button and move the mouse left or right.)

As you change your allocation, the chart of future potential values will adjust. When you are comfortable with the possible outcomes in the graph, click on "next" and you will see the next scenario.

FIG. 5B

| FIG. 5B-1 |
| FIG. 5B-2 |

FIG. 5B-1

Step 1: Determine Your Risk Tolerance

The first step of the Product Decision tool is to determine your personal risk tolerance. You will be asked to allocate your investment resources between a conservative and an aggressive asset. A series of these risk tolerance questions is asked (up to 10 with different conservative and aggressive assumptions) to ensure consistency and enhance the quality of the results.

Instructions:
Using the slider, allocate your resources between the two options. (To move the slider, click on the arrows on either end or click on the slider with your left mouse button and move the mouse left or right.)

As you change your allocation, the chart of future potential values will adjust. When you are comfortable with the possible outcomes in the graph, click on "next" and you will see the next scenario.

505

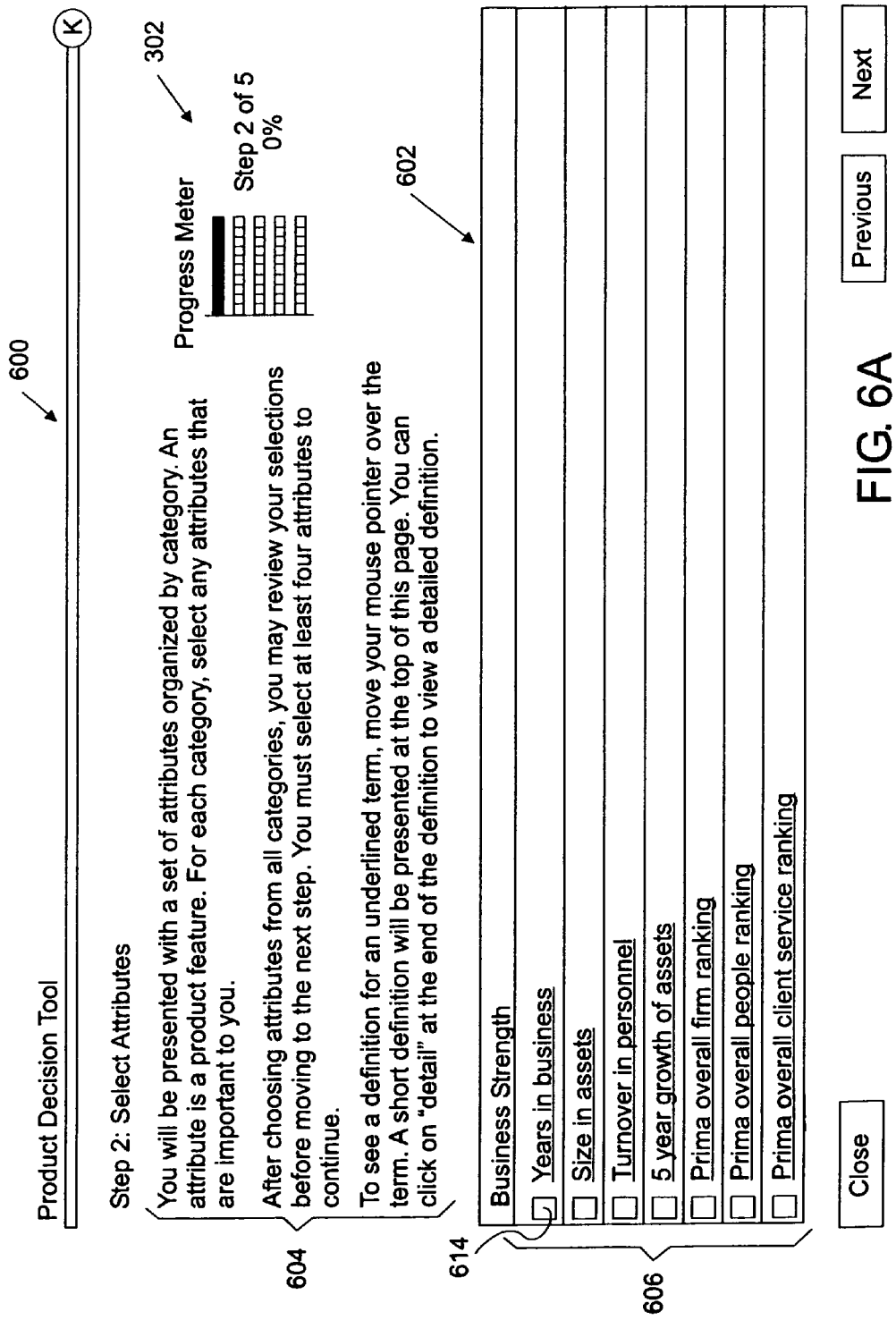

FIG. 6C-1

Product Decision Tool

Step 2: Select Attributes

Below is a list of all attributes that you selected. Before clicking next, please confirm that these attributes are your desired selections. ← 602

Progress Meter → 302
Step 2 of 5
80%

Business Strength
- ☐ Years in business
- ☐ Size in assets
- ☐ Turnover in personnel
- ☐ 5 year growth of assets
- ☐ Prima overall firm ranking
- ☐ Prima overall people ranking
- ☐ Prima overall client service ranking

Product Features
- ☐ Years product offered
- ☐ Assets managed 600, 606, 614

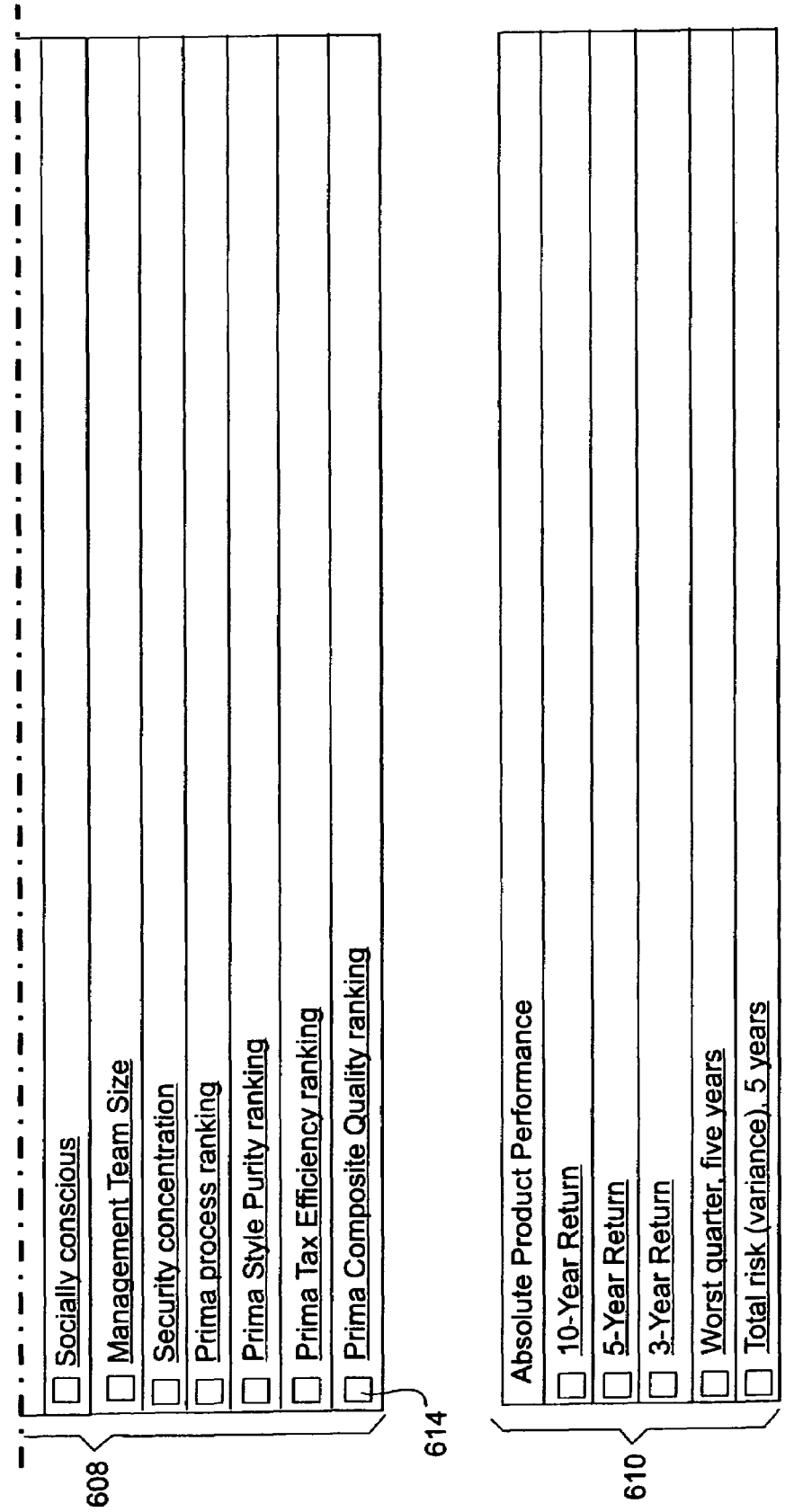

Market-Relative Product Performance

- ☐ 5-year Market Relative Risk
- ☐ 3-year Market Relative Risk
- ☐ 10-year market-relative risk adjusted return
- ☐ 5 year market-relative risk adjusted return
- ☐ 5-year up-market capture
- ☐ 5-year down-market capture
- ☐ Prima Performance ranking 612, 614

Close | Previous | Next

FIG. 6C-3

| FIG. 6C-1 |
| FIG. 6C-2 |
| FIG. 6C-3 |

FIG. 6C

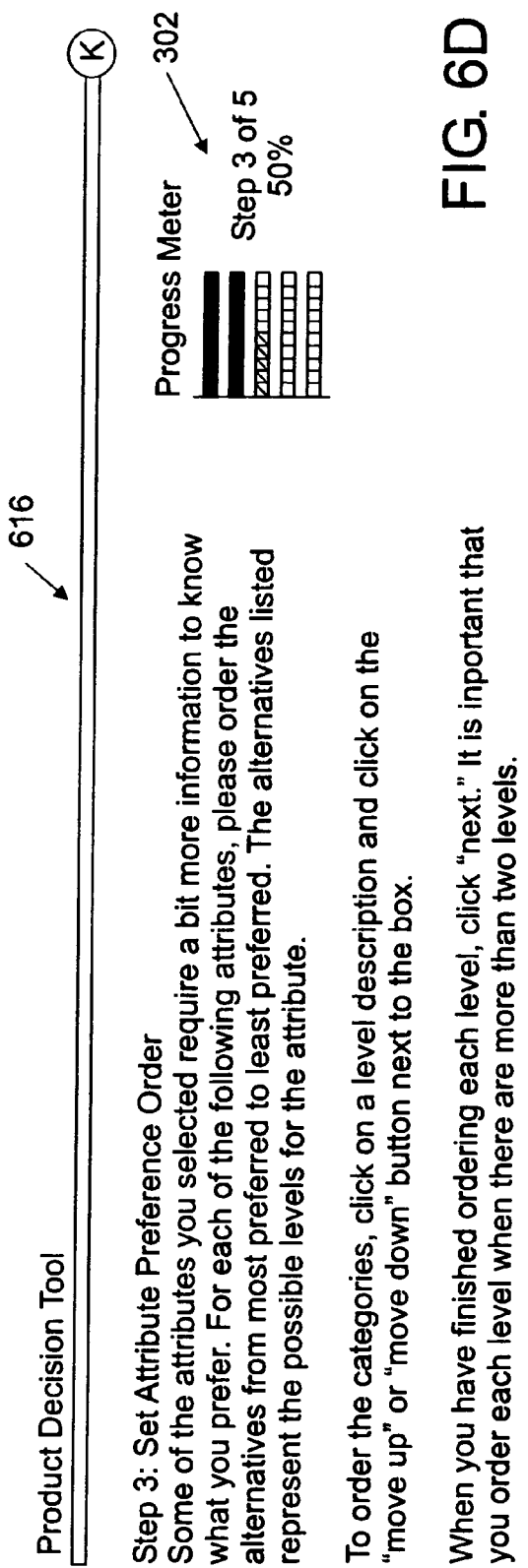
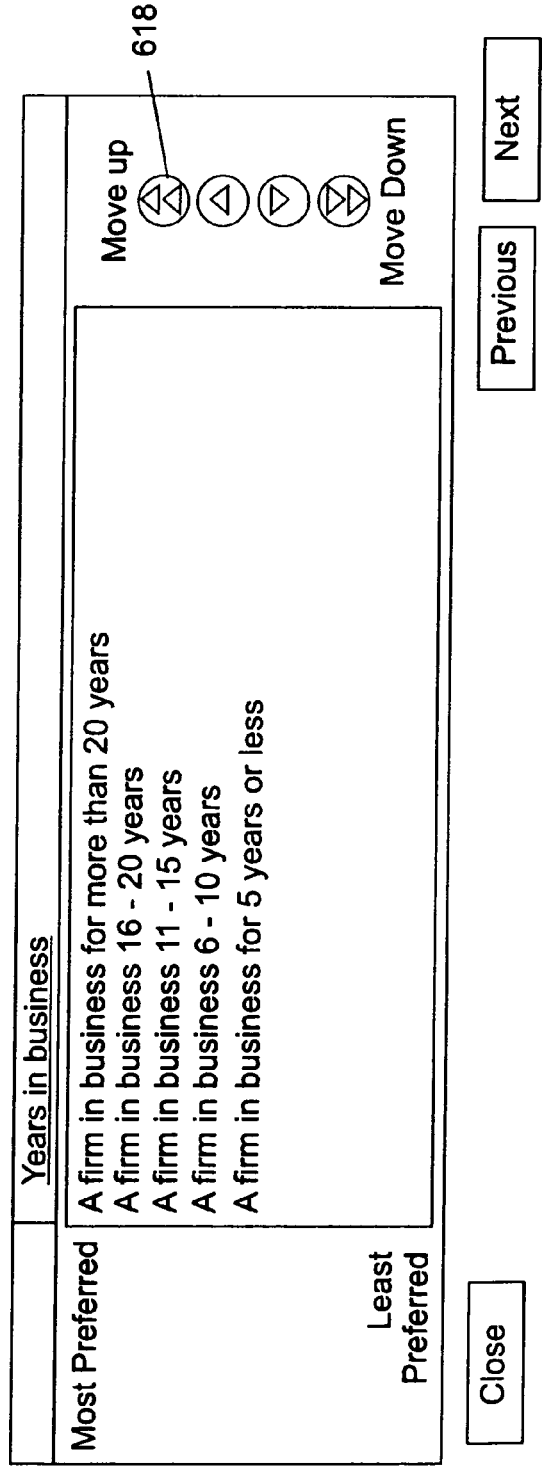
FIG. 6D

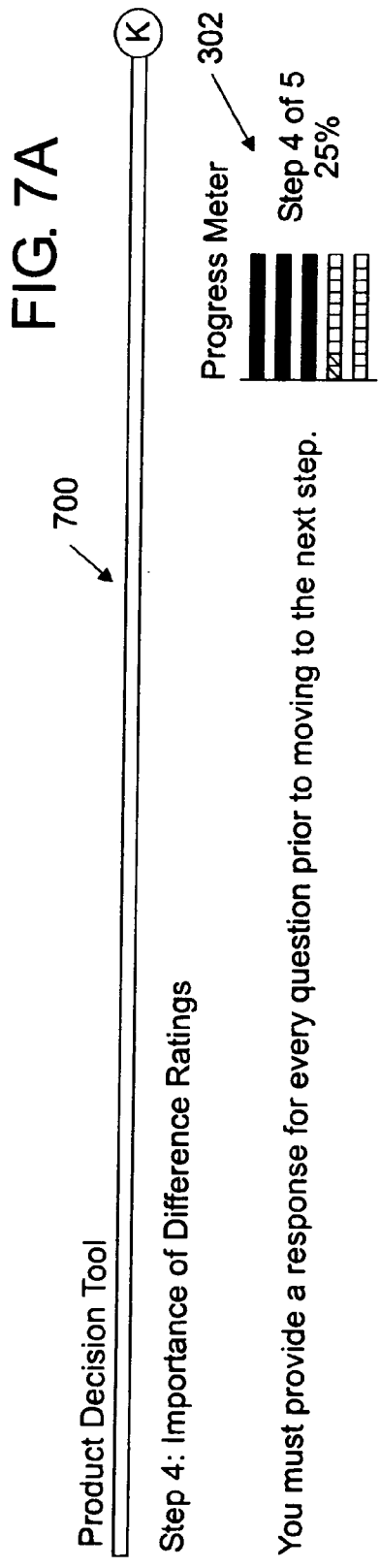

FIG. 7B

Product Decision Tool

Step 4: Importance of Difference Ratings

You will now be asked a series of "importance of difference" questions. One question is presented for each of the attributes you selected. You will rate the importance of the difference between a low value and a high value. You may identify the difference as "extremely important" (on the left), "not important" (on the right) or anywhere in between. You must provide a response for every question prior to moving to the next step.

Progress Meter
Step 4 of 5
0%

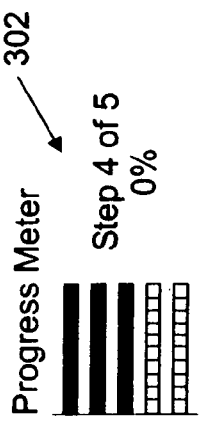

Years in business

How important is the difference between a product with …

"A firm is business for more than 20 years" -versus- "A firm in business for 5 years or less"

| Extremely Important | Very Important | Important | Somewhat Important | | Not Important |
|---|---|---|---|---|---|
| ○ | ○ | ○ | ○ | ○ | ○ |

Close                    Previous    Next

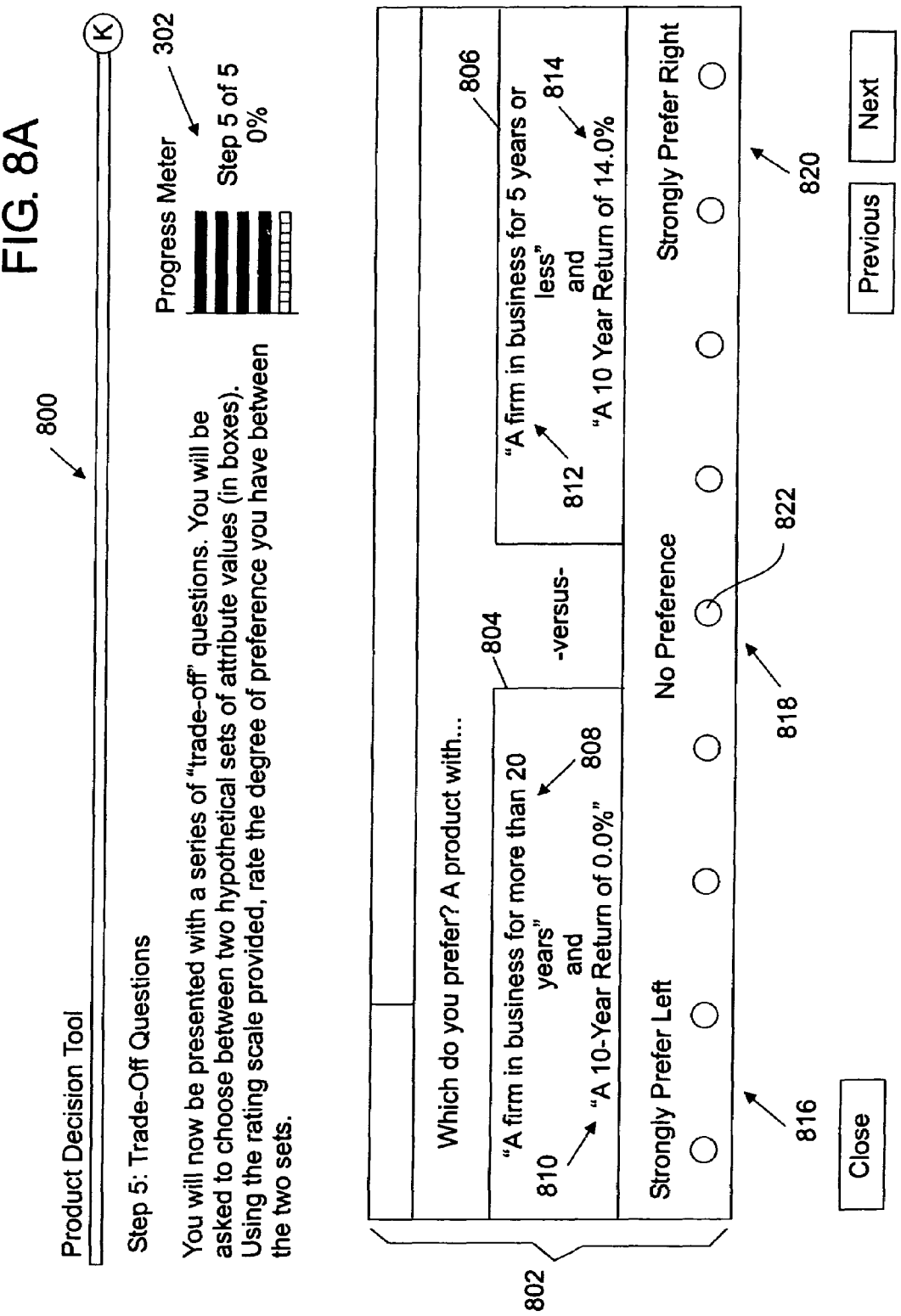

FIG. 8B

Product Decision Tool

Step 5: Trade-Off Questions

You must provide a response for every question prior to moving to the next step.

Progress Meter → Step 5 of 5  16.66%

Which do you prefer? A product with...

"Has been offered for more than 20 years" and "A 10-Year market-relative risk adjusted return of -5.0%"

-versus-

"A firm in business for 5 years or less" and "A 10 Year market-relative risk adjusted return of 5.0%"

Strongly Prefer Left  ○ ○ ○ ○ ○ ○ ○  Strongly Prefer Right

No Preference

Close   Previous   Next

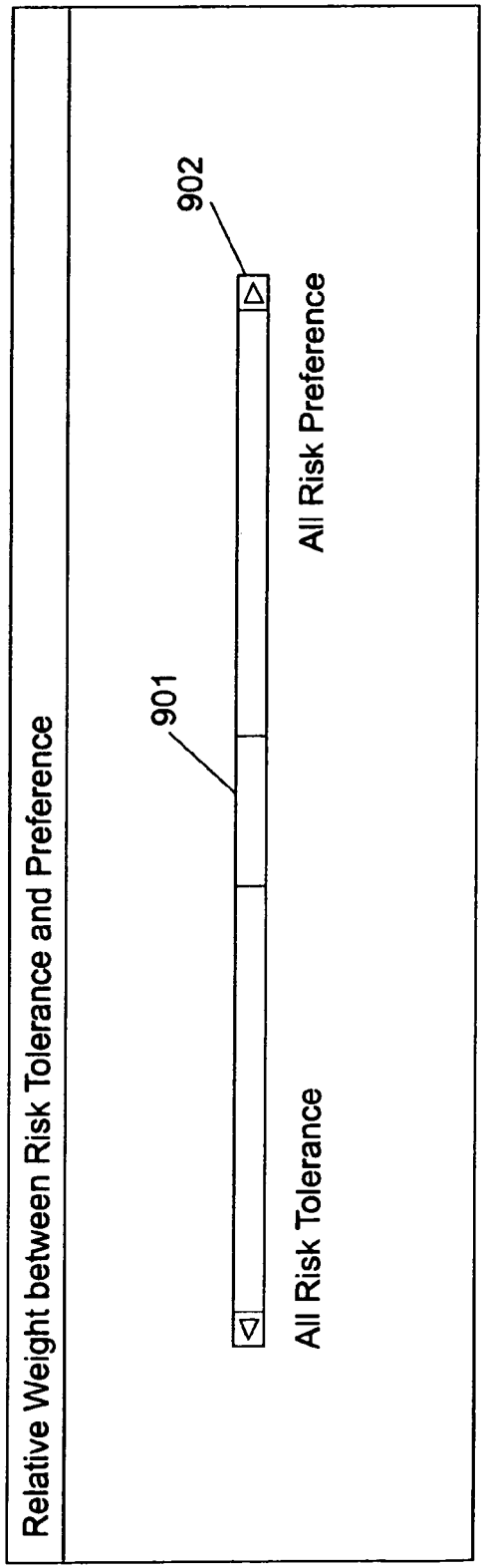

* Displays the products available to you relative to how well each matches your stated preferences, in descending order Product Decision Tool   FIG. 11A   1114

[Add Comparison Filter]

Below is a list of investment product alternatives. The list is ranked by your personal investment preference score (if you used the Product Decision Tool).

To look at details for a single product, simply click on the product name. You may also compare up to four products by checking the box next to each and then pressing the "Continue" button.

To reduce the number of products to consider, you may use the filter function. Start by clicking on the "Add Comparison Filter" button in th etop right corner of this page.

Step 1 - Select Products To Compare   1100

1110   1102

| Product Name | Investment Preference Score* |
|---|---|
| ☒ Fixed Income - Victory Capital Management Inc. | |
| ☐ Baron Small Cap Equity - Baron Capital Management | |
| ☐ Value - Third Avenue Management LLC | |
| ☑ Large Cap Value - Victory Capital Management Inc. | |
| ☐ Large Cap Equity - Rorer Asset Management, LLC | |
| ☐ Large Cap Value Equity - Fox Asset Management | |
| ☐ Large Cap Value Equity - 1838 Investment Advisors | |
| ☐ Large Cap Equity - Fred Alger Management, Inc. | |
| ☐ Core Equity - Badgley, Phelps and Bell, Inc. | |
| ☐ AIM Intrinsic Value - AIM Private Asset Management | |
| ☐ Small Cap - Lotsoff Capital Management | |
| ☐ Small Cap Value Equity - Fox Asset Management | |
| ☐ Large Cap Growth - Victory Capital Management Inc. | |
| ☐ US Core Opportunities - State Street Global Advisors | |
| ☐ US Small Cap Value Equity - Brandes Investment Partners, L.P. | |
| ☐ Small Cap Value - J. & W. Seilgman & Co., Inc. | |
| ☐ Large Cap Value Portfolio - Naveilier & Associates | |
| ☐ Large Cap Tax Smart - 1838 Investment Advisors | |
| ☐ Small Cap Value Portfolio - Naveilier & Associates | |
| ☐ International ADR - Gratry & Company | |
| ☐ Small Cap Equity - Awad Asset Management | |
| ☐ Large Cap Growth Portfolio - Naveilier & Associates | |
| ☐ Small Mid Cap Growth - Naveilier & Associates | |
| ☐ Small Cap Equity - Fred Alger Management, Inc. | |
| ☐ Small Cap Growth Opps - State Street Global Advisors | |

* Displays the products available to you relative to how well each matches your stated preferences in decending order.

FIG. 11B

Step 2 - Select the attributes you would like to compare across products

Select the attributes below that you want to compare. If you want to see details for all attributes, click on the "Select All" box.

If you used the Product Decision Tool, the attributes you selected as important are preceded by a red asterisk (*).

☐ Select All

Business Strength

☑ *Years in business ☐ Size in assets
☐ Turnover in personnel ☐ 5 year growth of assets
☐ Prima overall firm ranking ☐ Prima overall people ranking
☐ Prima overall client service ranking

Product Features

☐ *Years product offered ☐ Assets managed
☐ Socially conscious ☐ Management Team Size
☑ Security concentration ☐ Prima process ranking
☐ Prima Style Purity ranking ☐ Prima Tax Efficiency ranking
☐ Prima Composite Quality ranking

Absolute Product Performance

☑ *10-Year Return ☑ 5-Year Return
☐ 3-Year Return ☐ Worst quarter, five years
☐ Total risk (variance), 5 years

Market-Relative Product Performance

☐ 5-year Market Relative Risk ☐ 3-year Market Relative Risk
☐ *10-year market-relative risk adjusted return ☐ 5-year market-relative risk adjusted return
☐ 5-year up-market capture ☑ 5-year down-market capture
☐ Prima Performance ranking Step 3 - Press the Next button to see your results

[ Close ]                                                    [ Next ]

FIG. 11C

Product Comparison Tool

Select Attributes for Filtering

Clear Comparison Filter

You can use product filtering to reduce the products listed in comparison to those that meet specific attribute criteria. First select the attributes to use as filters.

| Product Filters |
|---|
| ☐ Asset Class |
| ☐ Capitalization |
| ☐ Style |

1118

Next

Previous

Close

Product Comparison Tool

Results

The table below displays product features. Only those attributes you selected in the Comparison Tool setup are displayed. Product information is organized by attribute category. If you used the Product Decision Tool, attributes you selected are preceded by a red asterisk (*).

| Attribute Category | Attribute | Small Cap Value - J. & W. Seligman & Co., Inc. | International ADR - Gratry & Company |
|---|---|---|---|
| Business Strength | Turnover in personnel | 0.4 | 0.3 |
| Attribute Category | Attribute | Small Cap Value - J. & W. Seligman & Co., Inc. | International ADR - Gratry & Company |
| Product Features | Security concentration | Medium (35 - 64) | High (<35) |
| Attribute Category | Attribute | Small Cap Value - J. & W. Seligman & Co., Inc. | International ADR - Gratry & Company |
| Absolute Product Performance | 3-Year Return | 7.13% | -19.15% |
| Attribute Category | Attribute | Small Cap Value - J. & W. Seligman & Co., Inc. | International ADR - Gratry & Company |
| Market-Relative Product Performance | 5-Year Market Relative Risk | 1.14 | 1.06 |

Close    Return to Comparison

FIG. 12

Product Decision Tool

The graph on this page shows your personal product allocation results. The percent next to each product shows the amount to be allocated to that specific product. The allocation percentages are based on your responses to the preference and trade off questions you answered in the preceding steps.

ized forms of display for use in one or more embodiments of the present invention.

METHOD AND SYSTEM FOR SELECTING BETWEEN OR ALLOCATING AMONG ALTERNATIVES

CROSS-REFERENCE TO RELATED APPLICATIONS

This application is a continuation-in-part of International Application No. PCT/US03/32381, filed Oct. 10, 2003 in the United States Receiving Office, which claims the benefit of provisional Application No. 60/417,857, filed Oct. 11, 2002.

COPYRIGHT NOTICE

Contained herein is material that is subject to copyright protection. The copyright owner has no objection to the facsimile reproduction of the patent document by any person in exactly the form as it appears in the Patent and Trademark Office patent files or records, but otherwise reserves all rights to the copyright whatsoever.

FIELD OF THE INVENTION

The present invention relates to decision making or the like, and more particularly to a method and system to select between complex alternatives or to allocate resources or the like among alternatives using conjoint analysis, analytical hierarchical processing (AHP) or the like combined with risk tolerance considerations.

BACKGROUND

Making decisions, selecting between alternatives or allocating resources among alternatives, particularly between complex alternatives with multiple different aspects and considerations, can be extremely difficult. This can be particularly so for individuals that are not knowledgeable in the field or endeavor involving the different alternatives. One such field is investing. Selecting between or allocating resources among different investment alternatives and financial advisors or managers has become especially difficult and making a good decision or selection has never been more important. Investments can range from something as simple as a certificate of deposit (CD) to something as complex as a specialty derivative financial instrument. The number of different investment opportunities is staggering including well over 25,000 mutual funds alone offered worldwide. An investment professional may make the decision seem easier but there are over 500,000 financial advisors with varying experience and expertise and employed in different capacities, such as financial planners, financial consultants, stock brokers, insurance agents and the like to name a few such titles. While many investors may use an investment professional to assist in making investment decisions or selections, there are millions of investors who are struggling to make these decisions on their own with little or no assistance. Probably the largest group of non-assisted investors is in the 401(k) market where there are now more than 40 million accounts. Besides an individual's personal residence, a 401(k) plan is often the largest investment an individual may have, yet these decisions are often made with little background knowledge and minimal if any information about the different investment alternatives or fund managers.

Another problem that arises in the investment decision process is that little if any consideration may be given to personal considerations, such as risk tolerance of the individual investor, and what weight to apply to such considerations versus other preferences in the overall selection process. Often only a rough estimate of the investor's risk tolerance may be determined. For example, the investor may be asked if he considers himself to be a conservative, moderate or aggressive investor without any parameters or empirical information for the investor to accurately determine in which category he may actually fall. These types of questions may also be too superficial to obtain an accurate measure of an investor's risk tolerance. Additionally, these types of questions do not produce any quantifiable risk tolerance measure that can be used to rank the alternatives based on the calculated risk tolerance specific for the particular investor.

SUMMARY

In accordance with an embodiment of the present invention, a method for selecting between or allocating resources among a plurality of alternatives may include determining a risk tolerance for a user. A plurality of attributes related to the alternatives may be presented for selection by the user. At least one of ranking the alternatives or allocating among the alternatives may be performed in response to analysis of the plurality of attributes and the risk tolerance of the user.

In accordance with another embodiment of the present invention, a method for selecting between a plurality of alternatives or allocating resources among the plurality of alternatives may include presenting a plurality of risk tolerance questions to a user. A risk tolerance for the user may then be measured based on responses of the user to the plurality of risk tolerance questions. A plurality of attributes related to the alternatives may be presented for selection by the user, and an analysis of the attributes selected by the user may be performed by conjoint analysis, AHP or the like. At least one of ranking the alternatives or allocating among the alternatives may be performed in response to a combination of the risk tolerance of the user and the analysis of the attributes selected by the user.

In accordance with a further embodiment of the present invention, a computer-readable medium having computer-executable instructions may be provided for performing a method including determining a risk tolerance for a user. A plurality of attributes may be presented for selection by the user. At least one of ranking the alternatives or allocating among the alternatives may be performed in response to analysis of the attributes and the risk tolerance of the user.

In accordance with another embodiment of the present invention, a system for selecting between a plurality of alternatives or allocating resources among the plurality of alternatives may include a plurality of attributes. A user interface generator may be adapted or programmed to present the plurality of attributes for the user to select those attributes of importance to the user. An analysis program may be included to determine user preferences of the alternatives based on analysis of the attributes selected by the user. A processor adapted or programmed to perform at least one of ranking the alternatives or allocating among the alternatives, in response to a combination of the analysis and a risk tolerance of the user, may also be provided.

BRIEF DESCRIPTION OF THE DRAWINGS

FIGS. 2A, 2B and 2C are a flow chart illustrating a sequence of graphical user interfaces, web pages or computer monitor screens to facilitate selection between alternatives, allocating resources among alternatives or both by a user in accordance with an embodiment of the present invention.

FIG. 3 is an example of a graphical user interface, web page or computer monitor screen to present instructions to the user for responding to risk tolerance questions or hypotheticals.

FIGS. 6A, 6B, 6C and 6D are examples of graphical user interfaces, web pages or computer monitor screens to present attributes for selection by a user in accordance with an embodiment of the present invention.

FIGS. 7A and 7B are an examples of graphical user interfaces, web pages or computer monitor screens to present importance of difference rating questions or hypotheticals for a user to select a degree of importance between the hypotheticals in accordance with the present invention.

FIGS. 8A and 8B are examples of graphical user interfaces, web pages or computer monitor screens to present trade-off questions for a user to select a degree of preference between hypotheticals in accordance with an embodiment of the present invention.

FIG. 9 is an example of a graphical user interface, web page or computer monitor screen to present a weighting scale for a user to allocate a percentage of weighting between risk tolerance and other preferences in accordance with an embodiment of the present invention.

FIGS. 11A, 11B and 11C are an example of a graphical user interface, web page or computer monitor screen to present alternatives and attributes related to the alternatives for selection by a user for comparison in accordance with an embodiment of the present invention.

FIG. 12 is an example of a graphical user interface, web page or computer monitor screen to present alternatives and attributes selected by a user/investor for comparison in accordance with an embodiment of the present invention.

DESCRIPTION OF THE INVENTION

The following detailed description of preferred embodiments refers to the accompanying drawings, which illustrate specific embodiments of the invention. Other embodiments having different structures and operations do not depart from the scope of the present invention.

Figure 1A:
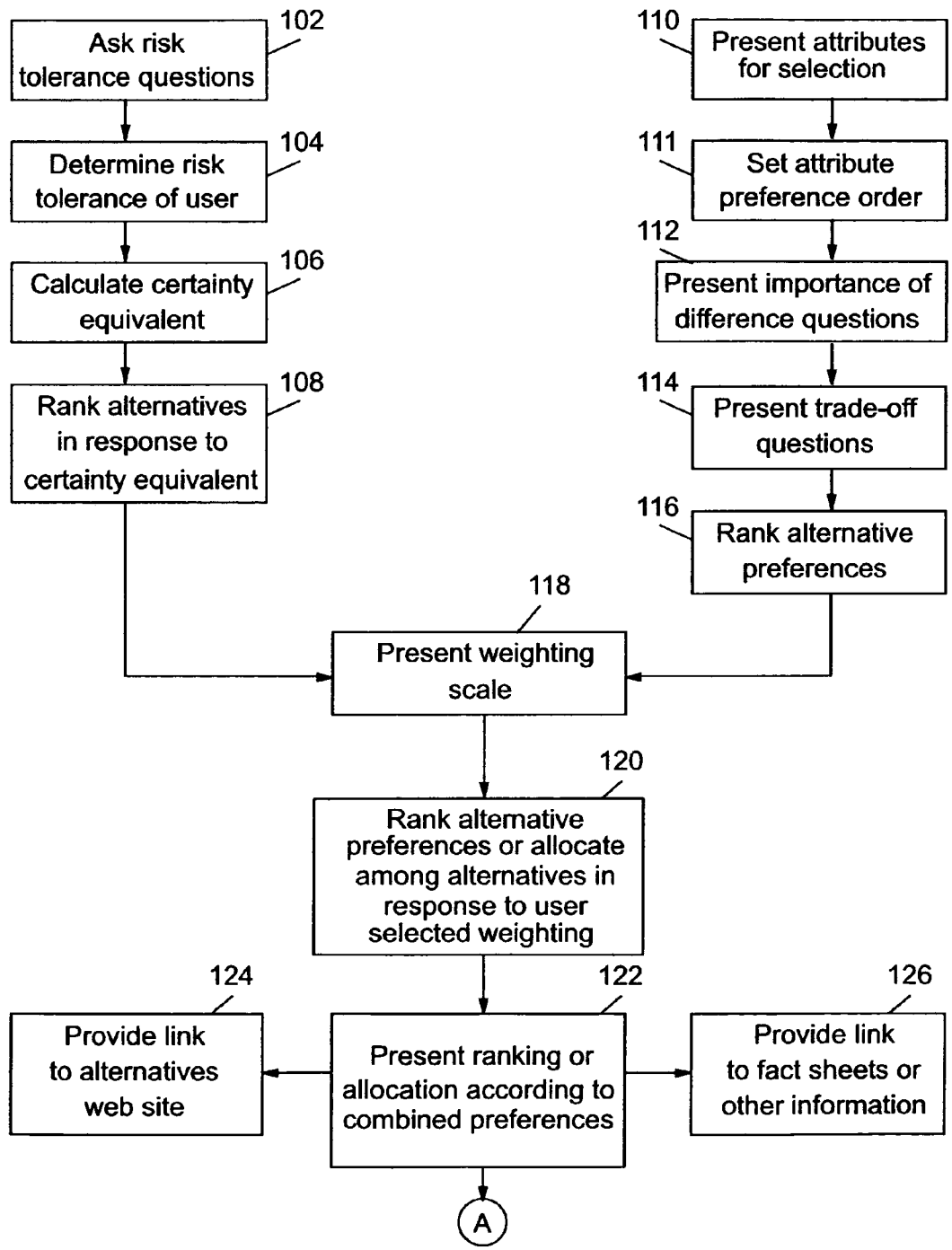
FIGS. 1A and 1B are a flow chart of a method for selecting between alternatives, allocating resources among alternatives or both in accordance with an embodiment of the present invention.
Figure 1B:
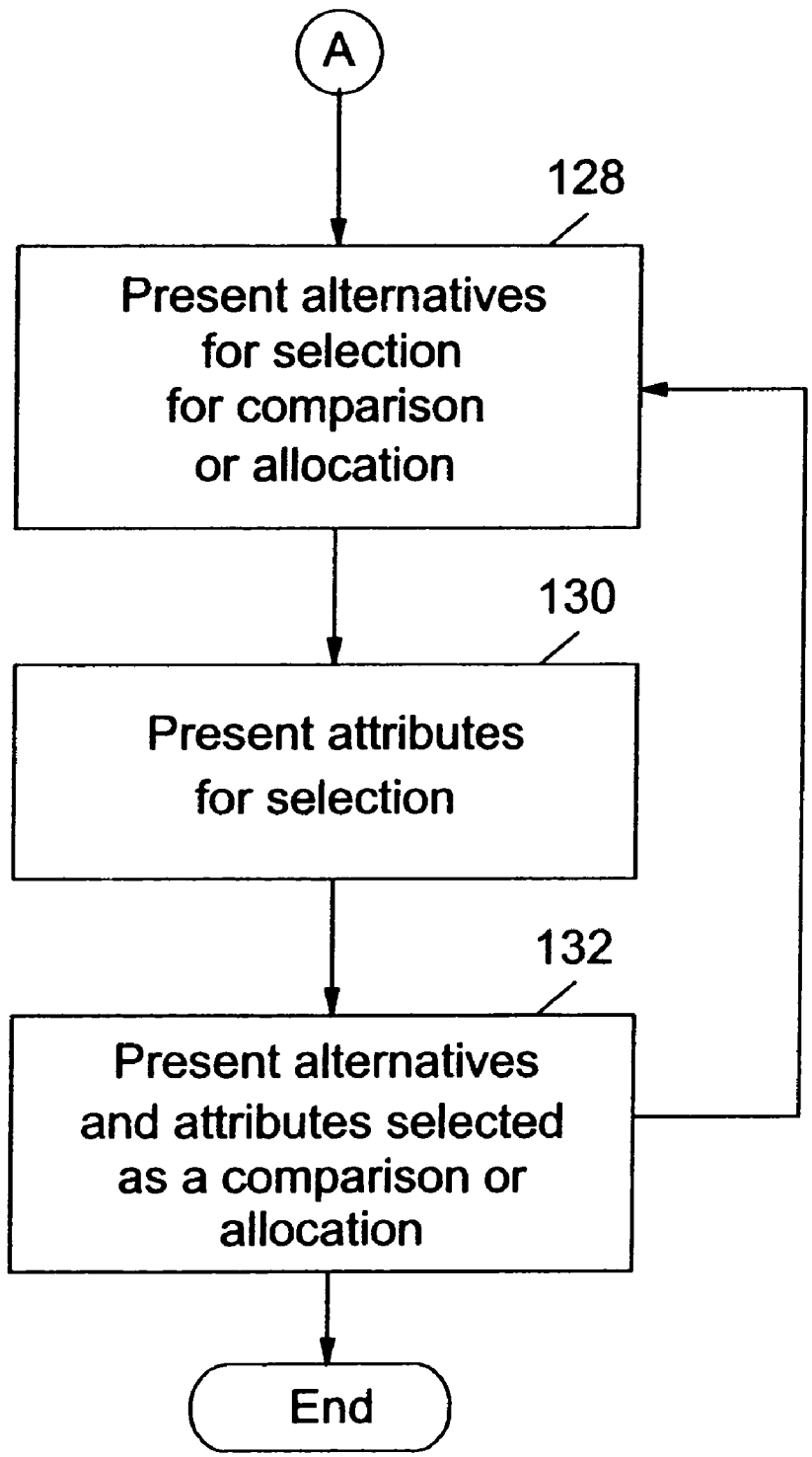

FIGS. 1A and 1B are a flow chart of a method 100 for selecting between alternatives, allocating resources among alternatives or both in accordance with an embodiment of the present invention. In block 102, a user, investor or the like may be asked a plurality of risk tolerance related questions and in block 104, the risk tolerance of the user may be determined by evaluating or analyzing the responses by the user to the plurality of risk tolerance questions. As described in more detail below, determining the risk tolerance of the user may include evaluating a selection by the user between at least one riskless asset hypothetical and a risky asset hypothetical. The user may be asked to select an acceptable percentage of the risky asset relative to the riskless asset or at what level of return, the user would be willing to accept the risky asset over the riskless asset. In block 106, a utility or certainty equivalent for each alternative or product may be calculated as a function of the user's risk tolerance and historical performance data or returns for each alternative. Thus the user's personal risk tolerance may first be calculated and then the risk tolerance for the particular user may be applied to historical performance information of each of the various alternatives to calculate a certainty equivalent for each alternative or investment.

The calculation of a single "risk tolerance" parameter for a user is necessary in order to calculate the individual certainty equivalents of each investment alternative being considered. The single risk tolerance parameter implies a "constant risk tolerance", which actually may change for a user under different circumstances. The constant risk tolerance and the circumstances that may cause it to change are discussed in more detail hereinbelow.

The risk tolerance determination or calculation in accordance with the present invention may be best understood by the following example. An assumption of risk tolerance for individuals is that most individuals are risk averse. This hypothesis may not hold true, however, when very large rewards are associated with very small bets, such as a lottery where appropriate calculations would show a lottery player to be a risk seeker, based on calculations that the expected return is less than the amount of the bet. But, for almost all serious investments, the assumption that an investor is risk averse will be true. If an individual is given a choice between two investment alternatives, one having a certain market value outcome, and the other having the same expected market value but with a degree of uncertainty attached to the outcome, then the rational choice for a risk averse investor would be the investment alternative with the certain outcome. As a first example, assume an individual starts with $100,000 and can choose between two alternative investments. The first investment guarantees a market value of $105,000 at the end of one year. The second investment has a 50 percent chance of a $102,000 ending market value and a 50 percent chance of a $108,000 ending market value. The expected market value for the second investment is $105,000, or the same as the certain ending market value for the first investment. If an investor were risk neutral, he or she would be indifferent between the two choices offered. However, it would be irrational to choose the second investment if the investor was even the slightest amount risk averse because the two investments offer the same expected outcome, but the second outcome is uncertain.

For a second example, assume the first investment only offers the investor a certain ending value of $104,000 compared to an expected but uncertain market value of $105,000 for the second investment alternative. The second investment is offering a $1,000 "risk premium" for accepting some degree of uncertainty in the outcome at the end of one year. An aggressive investor might decide they are willing to take that risk on the uncertainty of the outcome, whereas, a more conservative investor might still take the $104,000 certain outcome rather than an uncertain expected $105,000 ending market value. For a third example, the certain market value investment may be reduced to $103,000, thus increasing the risk premium to $2,000. The aggressive investor would still take the uncertain outcome from investment two, but an investor who is somewhat more conservative might also decide to take the risk of the uncertain outcome since the risk premium is higher than the previous scenario. These examples, like prior methods of determining risk tolerance for an individual do not quantify the difference between an aggressive investor and a conservative investor.

The equation for calculating the risk premium in the examples may be expressed by:

$$RP = EMV - CE \qquad \text{Eqn. 1}$$

where
RP=Risk premium
EMV=Expected market value
CE=Certainty equivalent.
For example 2 above RP=105,000−104,000=$1,000
For Example 3 above RP=105,000−103,000=$2,000

The calculation of the investor risk tolerance to determine at what risk premium a particular investor will trade an uncertain outcome for a certain outcome is the first step in determining a utility or certainty equivalent for each alternative and in ranking the alternatives in response to the utility or certainty equivalent in block 108. An extremely risk averse investor, who would have a risk tolerance of almost zero, would choose the certain outcome, no matter how much greater the expected ending market value of the uncertain outcome. On the other hand, the risk neutral investor would be indifferent between the certain and uncertain outcome as long as the expected market value of the uncertain alternative was equal to the guaranteed market value of the certain alternative investment. Most investors may be expected to fall somewhere between these two extremes.

From the example above, two different investors might be willing to accept an alternative investment with an uncertain outcome depending on the risk premium offered by the uncertain investment relative to the certain investment. The determination of certainty equivalents for different investors may be based on utility theory. Accordingly, a preference ranking for alternative investments based on the individual risk tolerance may be calculated by using known utility theory principles.

Instead of looking at the expected market value, as in the examples above, the expected utility for the certain and uncertain investment alternatives will be evaluated. A discrete distribution has uncertain outcomes with a probability assigned to each outcome such that the sum of the probabilities of both outcomes is equal to one. For explanatory purposes, a 50%, or 0.5, probability may be assigned to each outcome. The present invention is not limited to any particular probability and different probabilities may be assigned to the uncertain outcomes as long as the total is 100%. The equation for the expected utility of a discreet distribution may be expressed as:

$$E(U(X)) = \Sigma_x P(X=x) * U(x) \qquad \text{Eqn. 2}$$

Where the summation range includes every number x that is a possible value of the random variable X. The x is not the ending market value, but the gain or loss that results from each outcome. Accordingly, E(U(X)) is the expected utility, P(X=x) is the probability of the expected gain or loss, U(x) is the utility of the gain or loss. For the first example above, the equation 2 becomes:

$$E(U(X)) = 0.5 * U(2000) + 0.5 * U(8000) \qquad \text{Eqn. 3}$$

The equation for calculating the utility for each alternative may be expressed as:

$$U(X) = -e^{(-x/r)} \qquad \text{Eqn. 4}$$

Substituting equation 4 into equation 3 provides:

$$U(X) = 0.5 * (-e^{(-2000/r)}) + 0.5 * (-e^{(-8000/r)}) \qquad \text{Eqn. 5}$$

As evident from equation 5, the utility for a given alternative cannot be calculated without knowing the risk tolerance of the investor. While utility is an absolute number, it really only has meaning when compared to another utility. If an investor states they are indifferent between these two choices, the risk tolerance, r, can be calculated by setting equation 5 the utility for the uncertain outcome equal to the utility for the certain outcome, and solving for r, the risk tolerance. The utility for the certain outcome or riskless asset in the second example above is:

$$U(CE) = -e^{(-4000/r)} \qquad \text{Eqn. 6}$$

Setting equation 6 equal to equation 5 and solving for r, the risk tolerance provides:

$$-e^{(-4000/r)} = 0.5 * (-e^{(-2000/r)}) + 0.5 * (-e^{(8000/r)}) \qquad \text{Eqn. 7}$$

Equation 7 may be solved iteratively yielding an r=4156.

Substituting r=4156 into the certain utility calculation in equation 7 yields:

$$-e^{(-4000/4156)} = -0.382 \qquad \text{Eqn. 8}$$

and substituting r=4156 into the uncertain outcome side of equation 7 yields:

$$0.5 * (-e^{(2000/4156)}) + 0.5 * (-e^{(-8000/4156)}) = -0.382 \qquad \text{Eqn. 9}$$

Because the utility of the certain and uncertain outcome is the same for the investor with a risk tolerance of 4156, that investor would be indifferent between the two choices.

But, in the third example above, when the certain investment guarantees only a $3000 gain, for this same investor with a risk tolerance of $4156, the new utility for the certain outcome alternative is:

$$U(CE) = -e^{(-3000/4156)} = -0.486 \qquad \text{Eqn. 10}$$

Because the utility for the uncertain alternative is now greater than, less negative, than the utility for the new certain outcome, the investor with a risk tolerance of $4156 would choose the uncertain outcome investment. The above examples are used to explain the calculation of the utility for various investments to show how investors with different risk tolerances may make different choices. The calculations that may be used to determine risk tolerance in one embodiment of the present invention are detailed below.

In the above examples, the risk tolerance is calculated in dollars. For all calculations, the risk tolerance is in the same units as the alternatives presented. If the alternatives were presented in millions of dollars, the risk tolerance would be in millions of dollars. If the alternatives were presented in percent return, the risk tolerance would be calculated in percent return. Determining the risk tolerance in the same units in which the alternatives are provided or are to be evaluated may make ranking the alternatives easier.

Another consideration may be the assumption of constant risk tolerance for an investor or asking the investor to respond to risk tolerance questions that are similar in amount to the actual amount under consideration for investing by the investor. Accordingly, the questions presented to the investor may be adjusted to solve for a risk tolerance that may be substantially constant in the range of the dollar amount actually being invested by the investor. For example, a person might be willing to bet $1 on the flip of a coin coming up heads, a 50% probability, but that same individual may not be willing to place a single $100,000 bet on that same flip of the coin. The odds are the same, but the amount of the bet is so much larger that the individual has a different risk tolerance due to the possibility of losing $100,000 instead of only losing $1. In the present invention, the risk tolerance questions will be asked showing both a dollar amount based on the amount being invested and percent gain and loss outcomes at the same time. The percent and dollars can be converted one to another, but it will be easier for the investor to have both presented simultaneously. However, the percent risk tolerance may be used to calculate the rankings of the alternative investments.

One embodiment of the invention may use a series of questions that presents the investor with a choice between a hypothetical certain return investment and a second hypothetical investment with an uncertain return. The uncertain return investment may have an expected return and an expected standard deviation. The certain return investment may have a certain return with a standard deviation of zero. The investor may be asked to choose the percent of total funds to allocate to each investment with the remainder in the other investment. This allocation percentage will allow a calculation of the investor's risk tolerance as follows. For purposes of this illustration, the two hypothetical investments may be as follows:

|  | Outcome 1 | Outcome 2 | Return | Expected Standard Deviation |
|---|---|---|---|---|
| Certain Investment |  |  | r = 4.00% | 0.00% |
| Uncertain Investment | R = 30.00% Prob. = 50% | R = −5.00% Prob. = 50% | $E(R_M)$ = 12.50% | $S(R_M)$ = 17.50% |

The expected return, $E(R_M)$, and expected standard deviation, $S(R_M)$, of the uncertain investment may be calculated from basic statistical formulas using the two possible returns and the probabilities of occurring assigned to each.

For a combined portfolio of these two assets, the expected return may be $$E = X*E(R_M) + (1-X)*r \qquad \text{Eqn. 11}$$

Where X=the proportion of assets allocated to the uncertain investment. And the standard deviation of the combined portfolio may be:

$$S = X*S(R_M) \qquad \text{Eqn. 12}$$

The investor, by deciding what percent of the assets to allocate between the two investments, will be choosing X to maximize:

$$E - \frac{S^2}{t} \qquad \text{Eqn. 13}$$

Where t is the investor risk tolerance.

By substitution, this equation becomes:

$$X*E(R_M) + (1-X)*r - \frac{X^2*S(R_M)^2}{t} \qquad \text{Eqn. 14}$$

By taking the first derivative relative to X and setting it to zero, the following equation yields the optimal value of X to maximize Equation 12.

$$X = \frac{E(R_M) - r}{2*S(R_M)^2} * t \qquad \text{Eqn. 15}$$

But, the investor will be providing X with the answer to the risk tolerance question, so, by transposition, the equation is set to solve for t, the investor's risk tolerance, if X is known using the following formula:

$$t = \frac{2*X*S(R_M)^2}{E(R_M) - r} \qquad \text{Eqn. 16}$$

The resulting risk tolerances may be used for the calculations detailed later.

In ranking the alternatives in block 108, as previously discussed, the utility or certainty equivalent for each alternative may be calculated as a function of the user's or investor's risk tolerance and historical data for each alternative in block 106. Almost all investments, whether individual securities, mutual funds, variable annuities, treasury bills, or anything else have a history of returns. These returns may be calculated daily, weekly, monthly, quarterly, annually, or for any other period desired. A standard industry practice is to annualize the returns for periods greater than one year when discussing investment returns of professionally managed portfolios, such as mutual funds. Another standard practice is to annualize the standard deviation of these returns to provide a common frame of reference. Returns may be mathematically annualized based on raw monthly data or raw quarterly data and the results will be identical. The linking process for annualizing returns is explained below. However, even though the standard deviation of historical returns can be mathematically annualized using either monthly or quarterly raw data, the annualized standard deviation will not be the same. To deal with this inconsistency, for comparative purposes, if monthly data is not available for all of the investment alternatives, and some have only quarterly data, the monthly returns will first be linked to provide quarterly returns before the annualized standard deviations are calculated. To link the monthly returns, the returns must first be converted to decimal form. For example 3.6% becomes 0.036 and 2.4% becomes 0.024. The equation for linking the monthly returns may be:

$$R_a = ((1+R_{M1})*(1+R_{M2})* \ldots (1+R_{M12})) - 1 \qquad \text{Eqn. 17}$$

Where $R_{M1}$, $R_{M2}$ and $R_{M12}$ are the monthly returns for the first month, second month and so forth through the twelfth month. If the number of returns is less than one year, annualization of the returns would be inappropriate. If there are exactly twelve months of returns, the formula yields an annual return with no further adjustment.

As an example of annualizing quarterly returns, the quarterly returns for the S&P 500 may be used as illustrated in Table 1 below. The quarterly returns are expressed in percentages.

TABLE 1

|      | Quarter 1 | Quarter 2 | Quarter 3 | Quarter 4 |
|------|-----------|-----------|-----------|-----------|
| 2001 | −11.855   | 5.852     | −14.677   | 10.685    |
| 2000 | 2.294     | −2.657    | −.968     | −7.825    |
| 1999 | 4.983     | 7.049     | −6.244    | 14.880    |
| 1998 | 13.949    | 3.302     | −9.948    | 21.296    |
| 1997 | 2.681     | 17.458    | 7.491     | 2.871     |

There are a total of 20 periods of quarterly data over the five-year period being calculated. The returns for any one-year can be calculated by linking the four quarters as follows:

$$R_{1997} = (1+.02681) + (1+.17458) + (1+.07491) + (1+.02871) - 1$$
$$= .3336 = 33.36\%$$
Eqn. 18

The linking can be done for each year and then the years linked, or it can be done directly for the twenty quarters combined. In either case, the cumulative return for the five years is 0.6624 or 66.24%.

The annualized percentage may be calculated by the equation:

$$R_a = (1+R_C)^{(n/P_{tot})}$$
Eqn. 19

Where $R_a$ is the annualized return, $R_C$ is the cumulative return for the period, $P_{tot}$ is the total number of periods and n is the number of periods in a year. Substituting the cumulative return for the returns in Table 1, the Equation 19 becomes:

$$R_a = (1+0.6624)^{(4/20)} - 1 = 10.7\% \text{ annualized return}$$
Eqn. 20

If monthly data is being used for the calculations, the linking process is the same, but in the annualized return, n equals 12 for 12 months per year. The denominator in the exponent is the total number of months of data being annualized.

In order to calculate a certainty equivalent return for each investment alternative, the annualized standard deviation is also calculated. In Table 1 above, there are twenty quarters of data and the statistical standard deviation formula may be used to calculate the quarterly standard deviation of this data series. A sample standard deviation calculation can be used because an expected certainty equivalent return is being calculated for future periods.

$$\sigma_Q = \sqrt{\frac{\sum (x - \bar{x})^2}{(n-1)}}$$
Eqn. 21

Applying Equation 21 to the data in Table 1 yields a quarterly standard deviation of 9.91%. This quarterly standard deviation may be annualized by Equation 22:

$$\sigma_A = \sigma_Q * \sqrt{4} = 9.91 * 2 = 19.82\%$$
Eqn. 22

For monthly data conversion Equation 22 becomes:

$$\sigma_A = \sigma_M \sqrt{12}$$
Eqn. 23

The difference is the number of sub-periods within the annual period, i.e., months or quarters. The data from Table 1 thus provides an uncertain investment with an annual return of 10.7% and an annual standard deviation of 19.82%.

The calculation for the certainty equivalent return for a normally distributed set of outcomes, an assumption generally used in the financial markets, is as follows:

$$CE_r(N(\mu,\sigma)) = \mu - (\sigma^2/t)$$
Eqn. 24

Where $\mu$ is the annualized return and $\sigma$ is the annualized standard deviation. Assuming a risk tolerance of 40, Equation 24 becomes:

$$CE_r(N(\mu,\sigma)) = 10.7 - (19.82^2/40)$$
Eqn. 25

Equation 25 can be solved to provide a certainty equivalent of 0.88, meaning that this investor would be indifferent between a 0.88% certain return and a 10.7% uncertain return with a risk level, as measured by standard deviation, of 19.82%. Another way to look at the choice is the investor would require almost a 10% risk premium to accept the risk level of the uncertain outcome. This example uses a certainty equivalent formula for a normally distributed set of return data. However, other formulas may be used in this invention that are appropriate for other than normally distributed return data. For example, a portfolio that includes a use of option strategies may be normally distributed over certain returns, but truncated above or below other return levels. For this scenario, the use of a normal distribution certainty equivalent formula would not be appropriate.

Each alternative investment will have a historical set of risk and return data. For simplicity sake, the following example of ranking alternative investments will deal with the calculations as though all of the alternatives are being analyzed over only one five year period and that these returns are normally distributed, although the present invention is not limited to any particular time period or distribution of returns for each alternative. For purposes of this example the alternatives are assumed to have the returns and risks shown in Table 2.

TABLE 2

|               | 5 year return | 5 year risk (std. dev.) |
|---------------|---------------|-------------------------|
| Alternative 1 | 10.7%         | 19.82%                  |
| Alternative 2 | 8.5%          | 15.70%                  |
| Alternative 3 | 9.4%          | 20.50%                  |
| Alternative 4 | 11.5%         | 21.75%                  |
| Alternative 5 | 9.1%          | 17.82%                  |

Different investors would have different preferences for these alternatives based on the historical risk and return data. However, assuming a risk tolerance of 40, a certainty equivalent for each alternative can be calculated as illustrated in Table 3:

TABLE 3

|               | 5 year return | 5 year risk (std. dev.) | Certainty Equivalent |
|---------------|---------------|-------------------------|----------------------|
| Alternative 1 | 10.7%         | 19.82%                  | .88%                 |
| Alternative 2 | 8.5%          | 15.70%                  | 2.34%                |
| Alternative 3 | 9.4%          | 20.50%                  | −1.11%               |
| Alternative 4 | 11.5%         | 21.75%                  | −.33%                |
| Alternative 5 | 9.1%          | 17.82%                  | 1.16%                |

The alternatives may then be ranked based on their respective certainty equivalent as illustrate in Table 4:

TABLE 4

|  | 5 year return | 5 year risk (std. dev.) | Certainty Equivalent |
|---|---|---|---|
| Alternative 2 | 8.5% | 15.7% | 2.34% |
| Alternative 5 | 9.1% | 17.82% | 1.16% |
| Alternative 1 | 10.7% | 19.82% | .88% |
| Alternative 4 | 11.5% | 21.75% | −.33% |
| Alternative 3 | 9.4% | 20.50% | −1.11% |

Based on the risk tolerance of 40, the lowest return alternative is first in order of preference because of lower risk and the highest return alternative is only in fourth place because of the higher risk level. For another risk tolerance, the certainty equivalents would be different and the rankings may change.

Each investor may be asked a plurality of risk tolerance questions, each with a different hypothetical combination of riskless and risky outcomes. As each question is answered, a calculation may be made for the risk tolerance of that investor. These answers may be stored and used to check for a consistency of risk tolerance responses based on the individual answers. The measure of the consistency may be determined by one of two alternative methods, using a statistical measure of the deviation or an absolute variance from the mean of the answers. A predetermined number of risk tolerance questions may be stored in a database. In one embodiment of the present invention, at least twenty risk tolerance questions may be stored in the database. A selected number of risk tolerance questions may be chosen randomly from the predetermined number each time the risk tolerance measurement process is initiated. As explained in the following methodology, in one embodiment of the present invention, a maximum of fifteen questions may be asked for the determination of an investor risk tolerance, but less than that may be needed if the consistency measures are satisfied sooner.

As a first example, assume that an investor answers a series of questions and the risk tolerance is calculated from each response as follows:

| Question | Risk Tolerance | Mean | Standard Deviation | Low Limit | High Limit |
|---|---|---|---|---|---|
| 1 | 35 | | | | |
| 2 | 40 | | | | |
| 3 | 30 | | | | |
| 4 | 50 | | | | |
| 5 | 51 | 41.20 | 9.20 | 32.00 | 50.40 |
| 6 | 55 | 43.50 | 9.97 | 33.53 | 53.47 |
| 7 | 50 | 44.43 | 9.43 | 35.00 | 53.86 |

Again, for illustrative purposes, this example is using a range of plus or minus one standard deviation from the mean as an acceptable measure of consistency. In one embodiment of the invention, the range of the standard deviation may be set higher or lower than one standard deviation. The first five questions, the minimum number of questions that may be used, the risk tolerance questions are asked with the risk tolerance calculations providing the results shown. Then the next risk tolerance question, number 6, is asked. For question 6, the risk tolerance calculated is 55, which is outside the acceptable range of 32.00-50.40. The acceptable range is based on the results of the prior questions, but does not include the current question being asked. This answer is an out of sample answer. Since the answers are not within the acceptable consistency measure, another scenario is presented to the user. For question 7, the risk tolerance of 50 is within the acceptable range of 33.53-53.47, so the mean of the first seven questions, 44.43, is the risk tolerance used for calculating the certainty equivalents for the investment alternatives being evaluated. Only seven risk tolerance questions will be asked for this example and then the investor will begin with the preference questions.

For a second example, assume that the investor answers a series of questions and the risk tolerance is calculated from each response as follows:

| Question | Risk Tolerance | Mean | Absolute Variation | Low Limit | High Limit |
|---|---|---|---|---|---|
| 1 | 35 | | | | |
| 2 | 40 | | | | |
| 3 | 30 | | | | |
| 4 | 50 | | | | |
| 5 | 46 | 40.20 | 5.00 | 35.20 | 45.20 |
| 6 | 55 | 42.67 | 5.00 | 37.67 | 47.67 |
| 7 | 50 | 43.71 | 5.00 | 38.71 | 48.71 |
| 8 | 35 | 42.63 | 5.00 | 37.63 | 47.63 |
| 9 | 52 | 43.67 | 5.00 | 38.67 | 48.67 |
| 10 | 47 | 44.00 | 5.00 | 39.00 | 49.00 |

Again, for illustrative purposes, this example is using a range of plus or minus five, the absolute variation from the mean that may be an acceptable measure of consistency. In one embodiment of the invention, this range can be set higher or lower by the administrator of the system, but not by the individual investor making the choices. The first five, the minimum number to be used, risk tolerance questions are asked with the risk tolerance calculations providing the results shown. Then the next risk tolerance question, number 6, may be asked. For question 6, the risk tolerance of 55 is outside the acceptable range of 35.20-45.20. This continues until question 10 where the risk tolerance calculated 47 and is within the acceptable range of 38.67-48.67.

A system maximum of risk tolerance questions may be asked and the mean of the answers may be used even if no single answer falls within the predetermined acceptable ranges using either of the methodologies described above. The method selected and the acceptable range may be set at an administrative level and may not be changeable by the investor or the financial advisor, if there is one involved, assisting in the decision process.

The analysis of preferences portion of the method 100 begins at block 110. The analysis may involve a conjoint analysis process or the like. A conjoint analysis process is described in U.S. patent application Ser. No. 09/704,349, filed Nov. 1, 2000 and entitled: "METHOD, SYSTEM, AND COMPUTER PROGRAM PRODUCTS FOR FACILITATING USER CHOICES AMONG COMPLEX ALTERNATIVES USING CONJOINT ANALYSIS" by Jeff Johnston et al. and is incorporated herein in its entirety by reference.

Figure 6B:
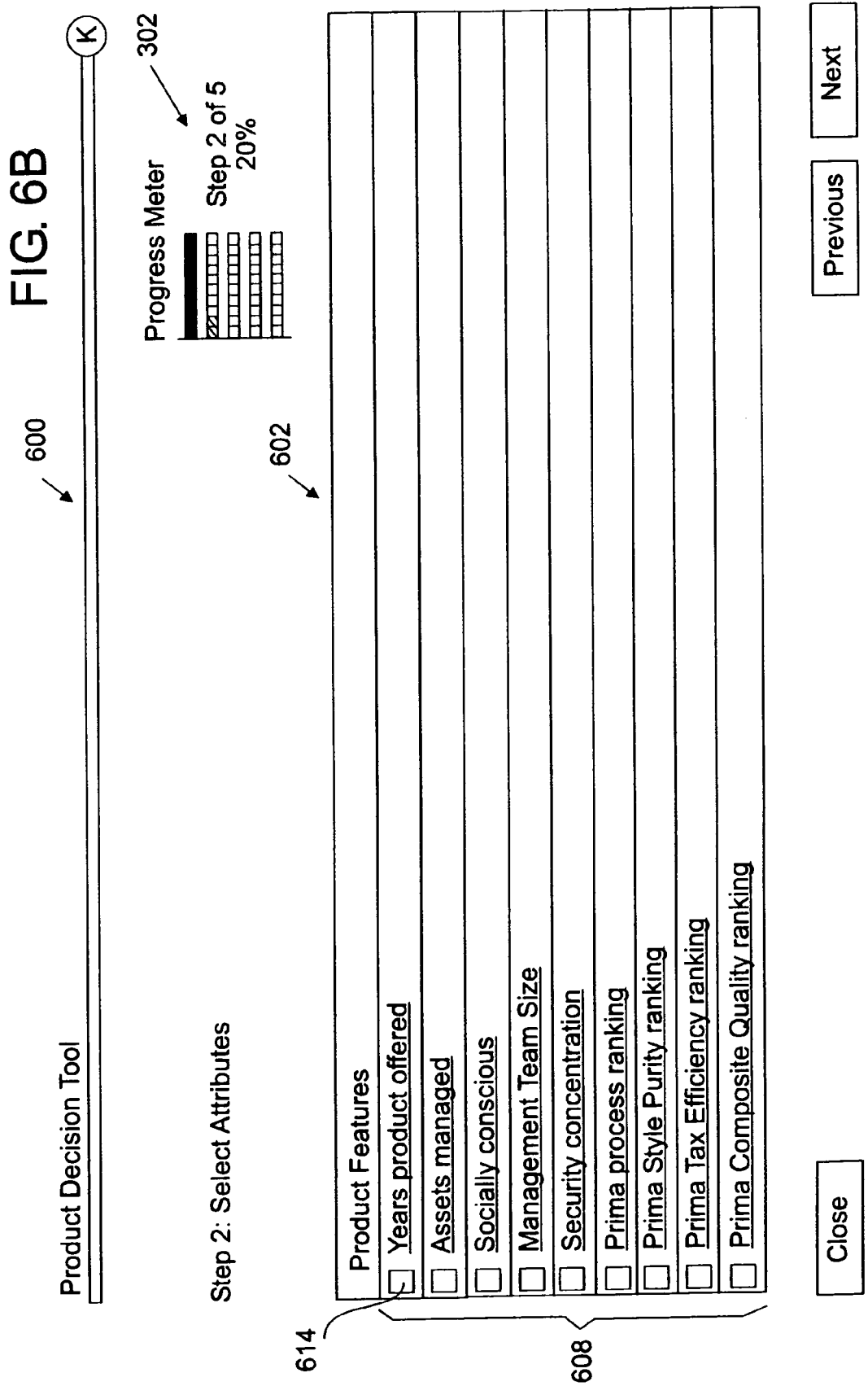

In block 110, a plurality of attributes related to the alternatives may be presented for selection by the user. Attributes may further define the alternatives. Examples of attributes for an investment manager or firm and an investment product are illustrated in FIGS. 6A-6C to be described herein in more detail. The user may select those attributes that are important to him. In block 111, for some attributes, the user may be asked to set the attributes in order according to preference. For example, from most preferred to least preferred. In block 112, a series of importance of difference questions may be presented for the user to select a degree of importance of difference between two hypothetical values for each attribute selected in block 110. The importance of difference questions may include a first hypothetical paired with a second hypothetical for each attribute selected by the user in block 110. The user may select a degree of importance of difference between the first hypothetical and the second hypothetical. The first hypothetical may have a high value or setting of an attribute compared to the second hypothetical which may have a relatively low value or setting for the attribute compared to the value of the attribute in the first hypothetical. For example, the first hypothetical may represent an advantageous or relatively desirous outcome or a best case scenario and the second hypothetical may represent a somewhat less desirous outcome or a worst case scenario. Accordingly, the first hypothetical may have a first predetermined value and the second hypothetical may have a second predetermined that is lower than a predetermined value of the first hypothetical. The range of degrees of importance of difference may range across about 9 choices from extremely important, very important, important, somewhat important and not important with varying degrees for selection by the user in between. An example of importance of degree of difference questions is illustrated in the example graphical user interfaces, web pages or monitor screen displays illustrated in FIGS. 7A and 7B to be described subsequently herein in more detail.

In block 114, a series of trade-off questions related to the attributes selected by the user in block 110 may be presented for the user to select a degree of preference. The series of trade-off questions may include presenting a plurality of sets of hypotheticals. Each set of hypotheticals may include a first pair of hypotheticals and a second pair of hypotheticals for the user to choose a degree of preference between the first pair of hypotheticals and the second pair of hypotheticals. Each first pair of hypotheticals may include a first hypothetical and a second hypothetical. The first hypothetical may have a predetermined value or setting of one attribute and the second hypothetical may have a predetermined value or setting of another attribute. Each second pair of hypotheticals may include a third hypothetical and a fourth hypothetical. The third hypothetical may have another predetermined value or setting of the one attribute lower than the predetermined value or setting of the first hypothetical and the fourth hypothetical may have another predetermined value or setting of the other attribute higher than the predetermined value of the other attribute in the second hypothetical. Accordingly, in the first pair of hypotheticals, a high value or more desirable hypothetical outcome of one attribute may be paired with a low value or less desirable hypothetical outcome of another attribute. In the second pair of hypotheticals, a low value or less desirable hypothetical outcome of the one attribute in the first pair of hypotheticals may be paired with a high value or more desirable hypothetical outcome of the other attribute in the first pair of hypotheticals. The user is then asked to select a degree of preference between the first pair of hypotheticals and the second pair of hypotheticals. The degree of preference may range from strongly preferring the first hypothetical to no preference between the paired hypotheticals to strongly preferring the second hypothetical with varying degrees of preference in between. Examples of trade-off questions are illustrated in the graphical user interfaces, web pages or computer monitor screens shown in FIGS. 8A and 8B to be described herein in more detail below.

In block 116, the alternatives are ranked in accordance to the analysis of the user's responses to the importance of difference questions in block 112 and the trade-off questions in block 114. As previously discussed, the analysis may involve conjoint analysis or the like. In an alternate embodiment, the analysis may involve analytic hierarchical process (AHP). AHP is described in *Decision Making in Economic, Political, Social and Technological Environments: The Analytic Hierarchy Process* by Thomas L. Saaty and Luis G. Vargas, 1994 and in *Decision Making for Leaders* by Thomas L. Saaty, 2001.

Conjoint analysis involves assigning quantitative values to the responses of the user to the attributes selected as important, the importance of difference questions and the trade-off questions. The quantitative data may then be represented in a vector and matrix format and regression analysis may be performed on the vector and matrix to provide a single number for each selected attribute indicating a preference for how important the user feels that attribute is in relation to each of the alternatives. For example, in the importance of difference questions the importance for any single attribute may be measured on a +4 to −4 scale ranging from extremely important to not important. Similarly, the trade-off questions comparing trade-offs between two pairs of attribute values as described above may also be measured on a scale from +4 to −4. A Y vector may be formed that quantitatively represents the attributes selected by the user as important and the Y vector may be bottom augmented by the quantitative importance of difference data. An X matrix may also be formed representing the quantitative importance of the difference data and bottom augmented by the quantitative trade-off data. Accordingly, each row of both the Y vector and the X matrix may represent a single response from the user in blocks 110, 112 and 114. Each column in the Y matrix may represent an attribute the user has chosen as important. Because the attributes, importance of difference questions and trade-off questions are related to the alternatives, regression analysis performed on the Y vector and X matrix may provide an indication of a preference that the user has for each of the alternatives.

Figure 10A:
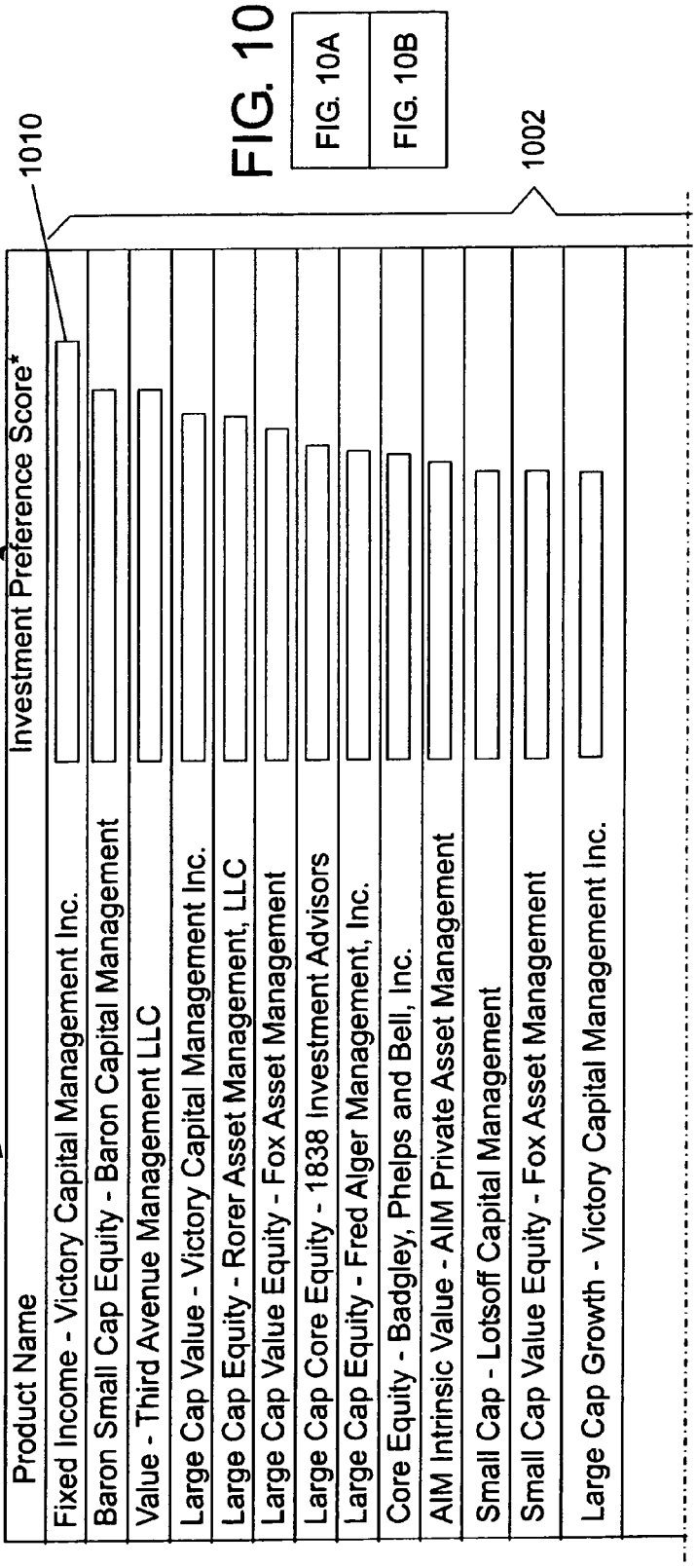
FIG. 10 is an example of a graphical user interface, web page or computer monitor screen to present alternatives ranked according to user preferences in accordance with an embodiment of the present invention.
Figure 10B:
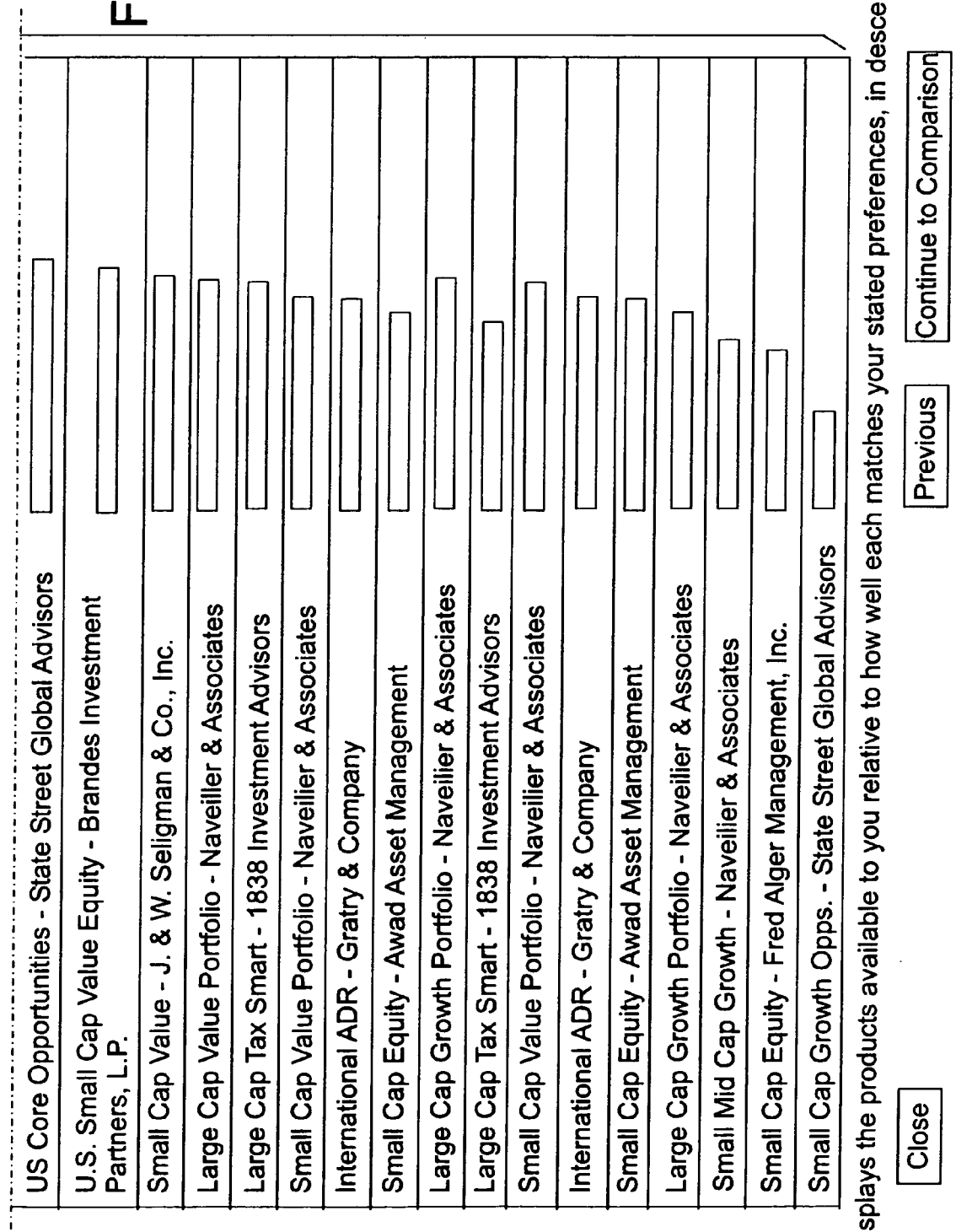
Figure 13A:
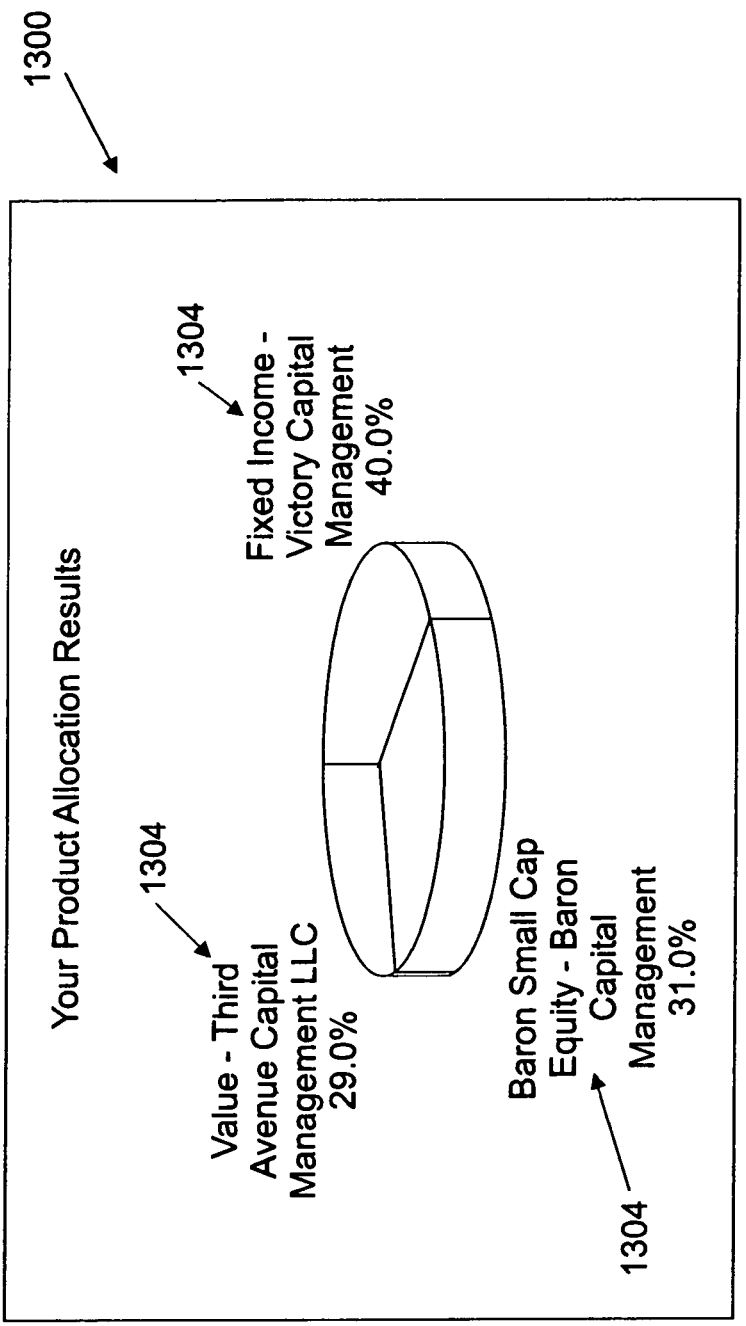
FIGS. 13A and 13B are each an example of a graphical user interface, web page or computer monitor screen to present to a user an allocation of resources among alternatives in accordance with an embodiment of the present invention.
Figure 13B:
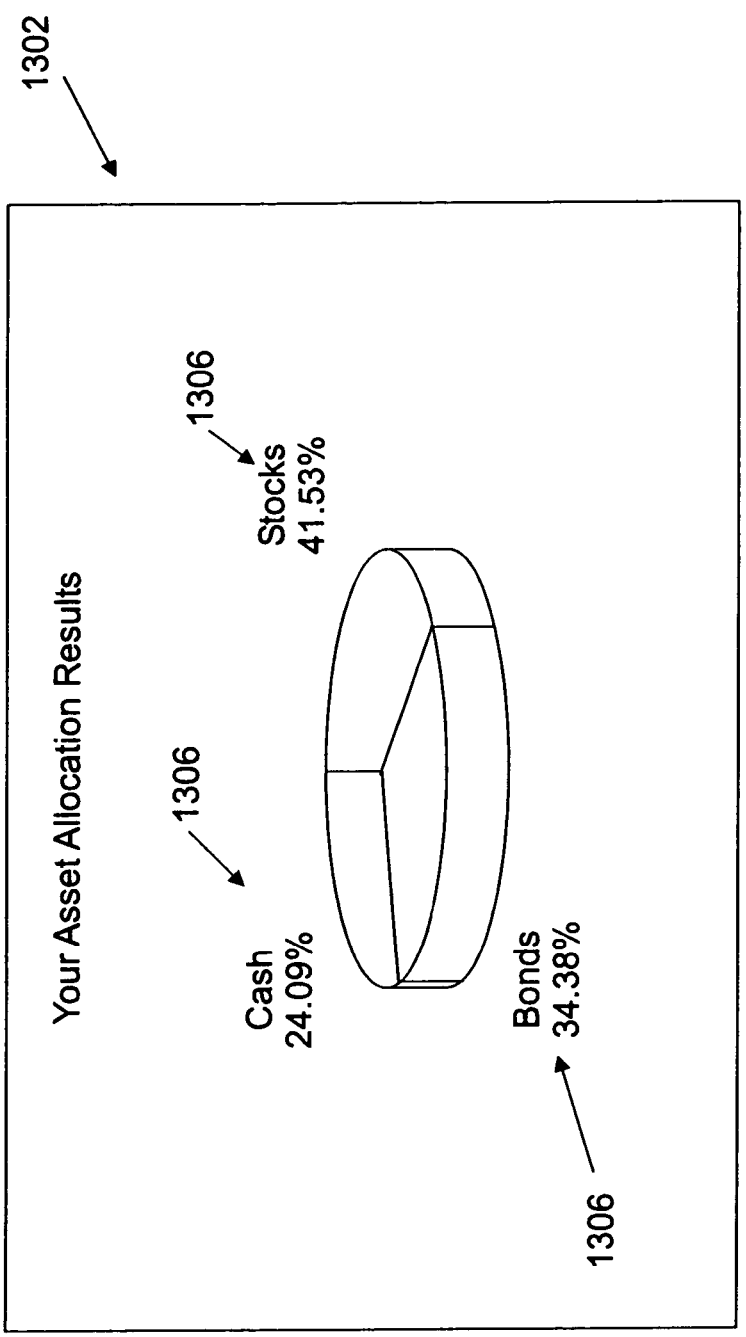

In block 118, a weighting scale may be presented for the user to allocate a percentage of weighting between the risk tolerance ranking determined in block 108 and the ranking in block 116 resulting from analysis of the attribute preferences of the user. An example of a web page or computer monitor screen presenting a weighting scale to the user for allocating a percentage of weighting between the risk tolerance and preferences from analysis of the attributes is illustrated in FIG. 9 to be described herein in more detail. In block 120, the alternatives may be ranked or an allocation of resources or the like among the alternatives may be performed or both in response to the weighting selected by the user between the risk tolerance and preferences from the conjoint analysis, AHP or other analysis. In block 122, the alternatives may be presented ranked or allocated in order of the user's weighting between the risk tolerance and other preferences in block 120. An example of a graphical user interface 1000, web page, or computer monitor screen presenting the ranked preferences is illustrated in FIG. 10 which will be described in more detail below. FIGS. 13A and 13B are each an example of a graphical user interface 1300 and 1302, web page, or computer monitor screen to present to a user an amount or percentage of resources, funds or the like that may be allocated to each alternative, such as a product 1304 (FIG. 13A), asset 1306 (FIG. 13B) or similar alternative. Accordingly, a user may select certain products 1304 or assets 1306 and request an allocation rather than a comparison or ranking. If an allocation result is requested, then FIG. 13A is an example of the allocation results for selected products 1304. FIG. 13B is another example that illustrates results for an asset 1306 allocation instead of a product allocation.

In block 124 a link may be provided to a web site for each alternative or for each investment manager or product. In block 126, a link may be provided to fact sheets or other information for each alternative that may be compiled and provided by the service provider or entity providing the method 100 to the user for selecting between alternatives or allocating resources or the like among alternatives.

In block 128 (FIG. 1B), the alternatives may be presented to the user for selection by the user for direct comparison between the alternatives. Alternatively or additionally, the alternatives may be presented for selection for allocating resources among the alternatives. An example of a graphical user interface, web page, or computer monitor screen presenting the alternatives for selection for comparison or allocation is illustrated in FIG. 11A as described in more detail below. In block 130, the attributes related to the alternatives may be presented to the user for selection of the attributes for comparison. The attributes previously selected by the user may be highlighted or in some way identified to remind the user that these attributes were previously selected by the user as important and used in the analysis of his selections. In block 132, the alternatives selected by the user for comparison or allocation along with the attributes selected for comparison may be presented to the user. Any attributes previously selected by the user as important may be highlighted or in some way identified. An example of a web page or computer monitor screen illustrating a comparison of different alternatives and attributes is shown in FIG. 12. From block 132 the user may return to block 128 to select other alternatives for comparison. The user may also go back to blocks 102 or 110 and go through the method 100 again.

As previously described, an alternative to rank ordering the alternatives in block 122, the weighting selected by the user between the risk tolerance and other preferences can be used to calculate a preferable allocation of resources or the like among the various alternatives as described below. The following example uses an asset allocation decision, but the same methodology can be applied to any allocation problem where the desired solution is to allocate resources or the like among the available choices.

For each of the attributes, a value is calculated. In this example of an asset allocation decision, typical attributes might be cumulative 5 year return, cumulative 15 year return, tax efficiency, current income, risk adjusted returns, or the like. The value that is calculated for each attribute for each asset class is dependent on the attribute characteristics. For example, five-year cumulative return can be expressed as a compounded result based on the growth of $1, a convention that is common in the financial industry. Attribute 1 in the table below shows the result of the compounding of each asset class over five years with annual returns for cash of 1.93%, bonds 5% and stocks 10%. No specific attributes are used in this example as the attributes may vary across different users of the method 100 of the present invention. However, each of the attributes may be selected by a user as a preferred attribute and for which a "final computed importance" may be calculated using the conjoint analysis, AHP or the like as described previously. The following table shows the values calculated for each alternative or asset class for each attribute selected by the user or investor.

|  | Attribute 1 | Attribute 2 | Attribute 3 | Attribute 4 |
|---|---|---|---|---|
| Stocks | 1.61 | 4.18 | 1.50 | 0.10 |
| Bonds | 1.28 | 2.08 | 5.00 | 0.50 |
| Cash | 1.10 | 1.35 | 2.00 | 1.00 |

The next steps are to transform and then normalize the values of each attribute to a total of one. The following example shows the process for the four attributes in the above table. First the actual value calculated for each attribute is transformed on a scale of one to five to match the other scaling used to calculate the "B" coefficients in Equation 28 below.

$$v^t_i = 1 + (v_i - v_{min})/((v_{max} - v_{min})(5-1))$$ Eqn. 26

Where the following nomenclature applies to each factor individually:
$v^t_i$=the transformed value of the ith row of each attribute
$v_i$=the value of the ith row of each attribute
$v_{max}$=the maximum value of each attribute
$v_{min}$=the minimum value of each attribute The transformed values for the attributes are as follows:

|  | Attribute 1 | Attribute 2 | Attribute 3 | Attribute 4 |
|---|---|---|---|---|
| Stocks | 5.000 | 5.000 | 1.000 | 1.000 |
| Bonds | 2.360 | 2.036 | 5.000 | 2.778 |
| Cash | 1.000 | 1.000 | 2.143 | 5.000 |
| Sum | 8.360 | 8.036 | 8.143 | 8.778 |

In some cases, the values may be normalized to a number other than five. If so, the numerator in Equation 26 would be changed accordingly. The next step is to normalize the values so the sum of the normalized attributes for each variable is 1. These values identify the relative strength of each attribute for each asset class with the sum of the relative strengths equaling one.

$$v_{ni} = v^t_i \bigg/ \sum_i^n v^t_i$$ Eqn. 27

Where
$v_{ni}$=normalized value of the ith row of each attribute
$v^t_i$=transformed value of the ith row of each attribute
n=maximum number of values for each attribute The following table is the resulting relative strength matrix:

|  | Attribute 1 | Attribute 2 | Attribute 3 | Attribute 4 |
|---|---|---|---|---|
| Stocks | 0.598 | 0.622 | 0.123 | 0.114 |
| Bonds | 0.282 | 0.253 | 0.614 | 0.316 |
| Cash | 0.120 | 0.124 | 0.263 | 0.570 |

The next step is to convert a "final computed importance" for each attribute to a relative importance for each attribute. This is similar to the normalization process for the relative strengths.

$$B_{ni} = B_i \bigg/ \sum_1^n B_i$$ Eqn. 28

Where
$B_{ni}$=normalized "final computed importance" for the ith attribute
$B_i$="final computed importance" for the ith attribute
n=total number of attributes selected The following table shows this process for an assumed set of calculated "B"s, "final computed importances" for each attribute.

|  | "final computed importance" | "relative importance" vector |
|---|---|---|
| Attribute 1 | 2.675 | .202 |
| Attribute 2 | 5.244 | .397 |
| Attribute 3 | 2.636 | .199 |
| Attribute 4 | 2.665 | .202 |

The final asset allocation is determined by multiplying the relative strength matrix times the relative importance vector.

| Asset Class | Weighting |
|---|---|
| Stocks | 41.53% |
| Bonds | 34.38% |
| Cash | 24.09% |

The resulting asset allocation is consistent with the preferences of the investor and strengths of the asset classes. This example shows four attributes and three asset classes, but the analysis can be expanded to include more attributes and allocation across more asset classes, styles within an asset class, or even predefined portfolios that are available as investment options.

Figure 2B:
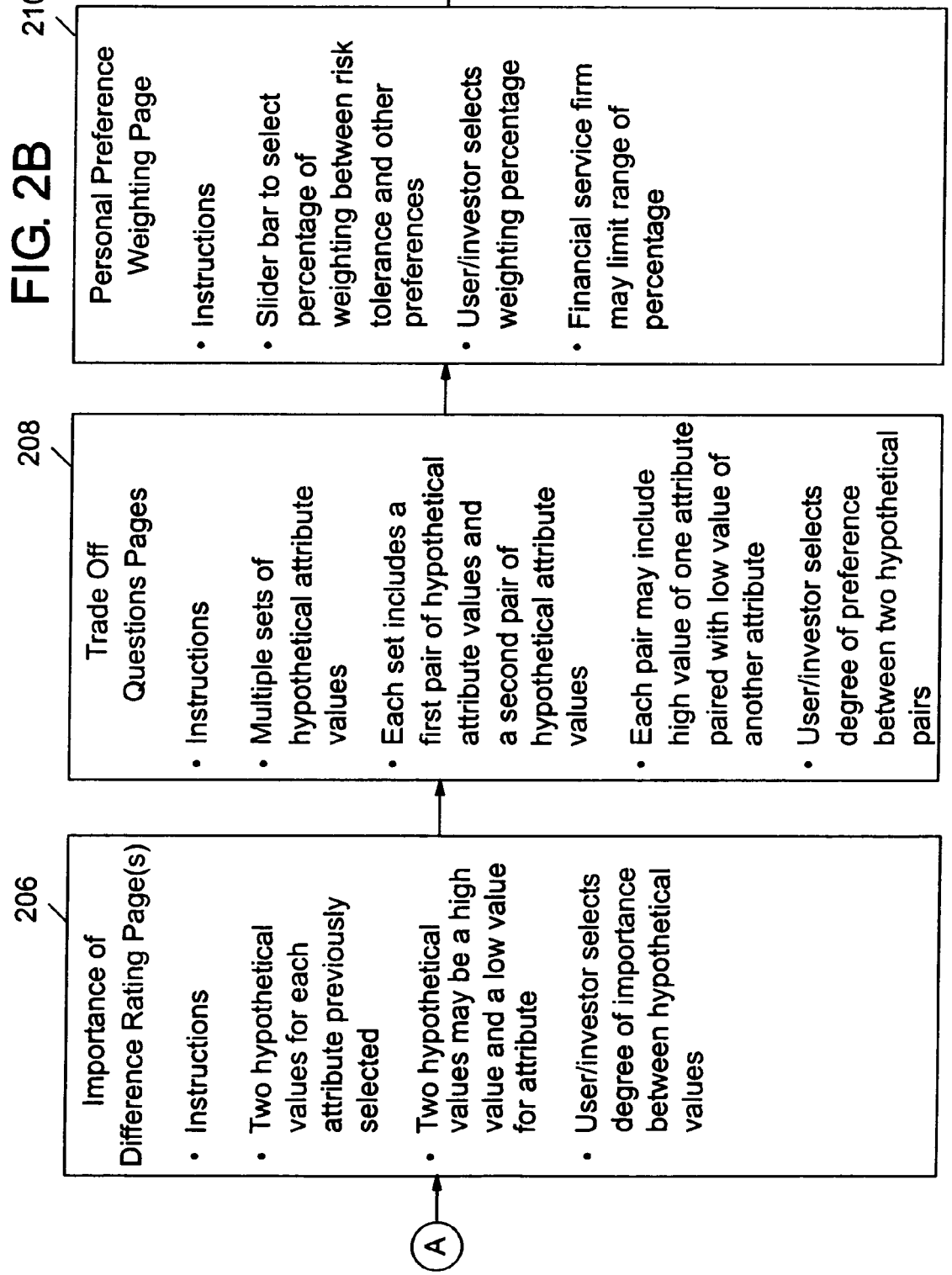

FIGS. 2A, 2B and 2C are a flow chart illustrating a sequence of graphical user interfaces, web pages or computer monitor screens or screen shots to facilitate selection by a user between alternatives in accordance with an embodiment of the present invention. An introduction and instruction page 200 may be presented to the user to provide an overview of the process, general instructions, what is involved and what results may be obtained or expected from the process. The instruction page may also provide instructions for responding to the risk tolerance questions or hypotheticals to follow. FIG. 3 illustrates an example of a web page 300 or computer screen shot to present an overview and instructions to the user for responding to the risk tolerance questions or hypotheticals.

Figure 4A:
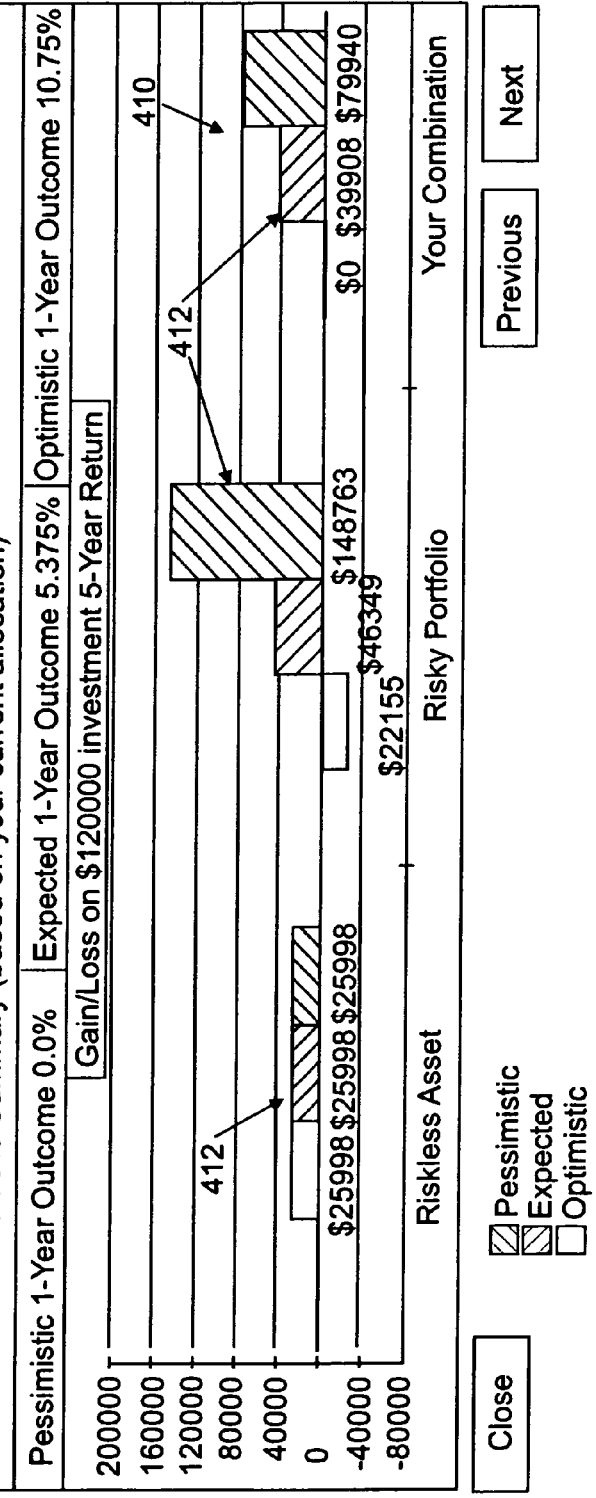
FIGS. 4A and 4B are each an example of a graphical user interface, web page or computer monitor screen to present a hypothetical to evaluate the risk tolerance of a user in accordance with one embodiment of the present invention.
Figure 4B:
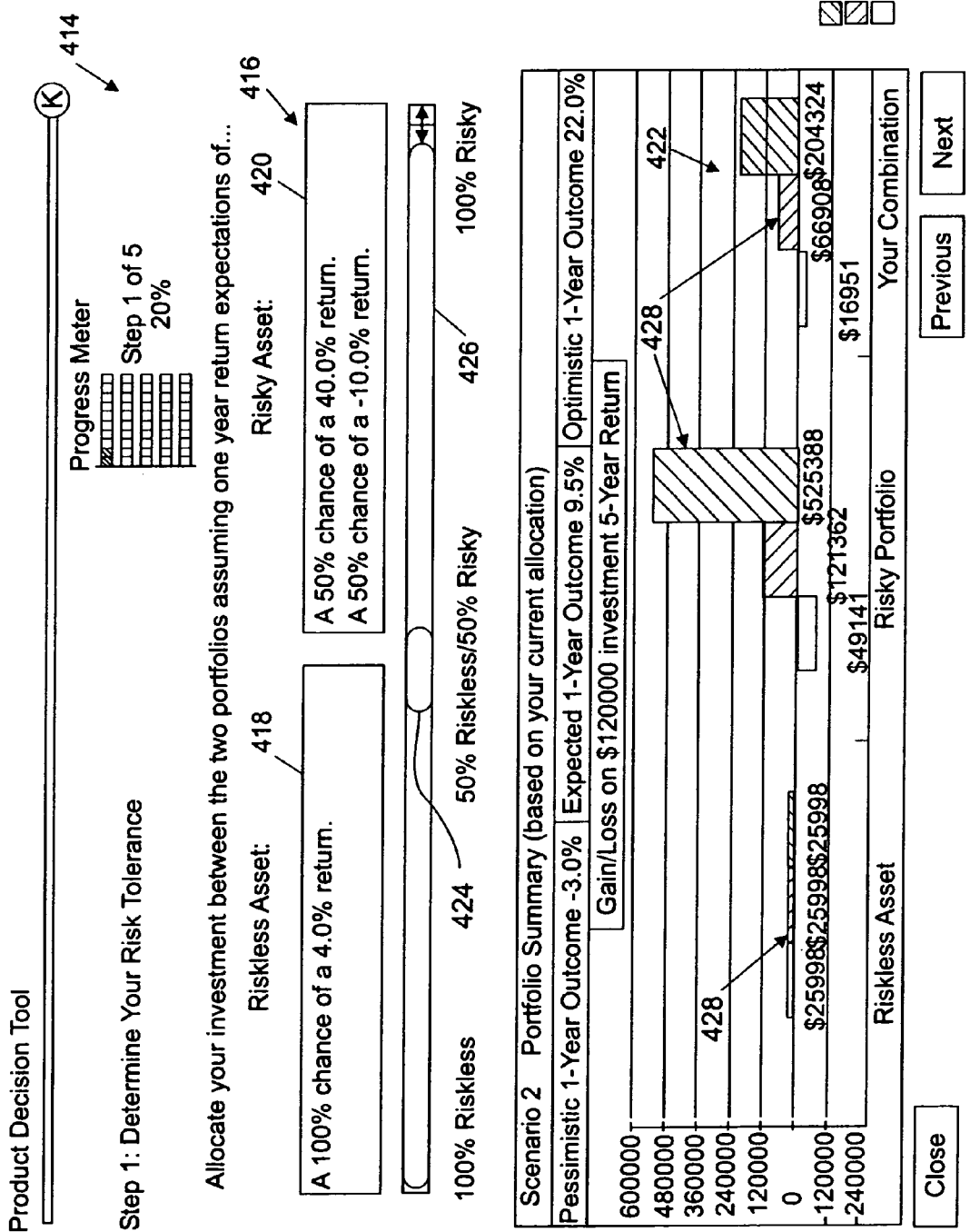

From the introduction and instruction page 200, the user may continue to the risk tolerance evaluation questions 202, which may include a plurality of pages. Examples of the risk tolerance evaluation questions 202 in accordance with one embodiment of the present invention are illustrated in FIGS. 4A and 4B as web pages 400 (FIG. 4A) and 414 (FIG. 4B), computer monitor screens or graphical user interfaces. The web page 400 presents a hypothetical risk tolerance question or portfolio selection option 402 to a user or investor to evaluate the risk tolerance of the user in accordance with an embodiment of the present invention. As previously discussed, each risk tolerance question 402 may present an example of a riskless asset 404 hypothetical and a risky asset 406 hypothetical. The risky asset hypothetical 406 may be expressed as a 50% chance of a favorable outcome or a gain and a 50% chance of an unfavorable outcome or loss. A slider bar 408 including a slider 409 or the like may be provided for the user to select a percentage of the risky asset 406 (or the riskless asset 404) that the user would accept in a combined portfolio 410. The user may select the percentage using a pointing device, such as a mouse or the like. As the user moves the slider 409, the combined portfolio 410 may change to show the different expected outcomes as the percentage of the risky asset 406 is changed.

The risk tolerance question or hypothetical 416 in FIG. 4B may be similar but with different percentages of returns for the riskless asset 418 and risky asset 420. The combined portfolio 422 will be different as the slider 424 is moved along the slider bar 426 by the user to select a different percentage of the risky asset 420 that would be acceptable to the user in a combined portfolio 422. A plurality of different risk tolerance questions or hypotheticals like questions 402 and 416 may be presented to obtain an accurate evaluation of the user's risk tolerance in response to the user's responses to the varying hypothetical investment returns.

FIGS. 4A and 4B may also include graphical representations 412 and 428 of the changes in the portfolio as the respective slider 409 or 424 is moved by the user with a pointing device, such as a mouse or the like, to facilitate making a decision of an acceptable percentage of the risky asset 406 or 420 relative to the riskless asset 404 or 418.

Figures 2, 5A:
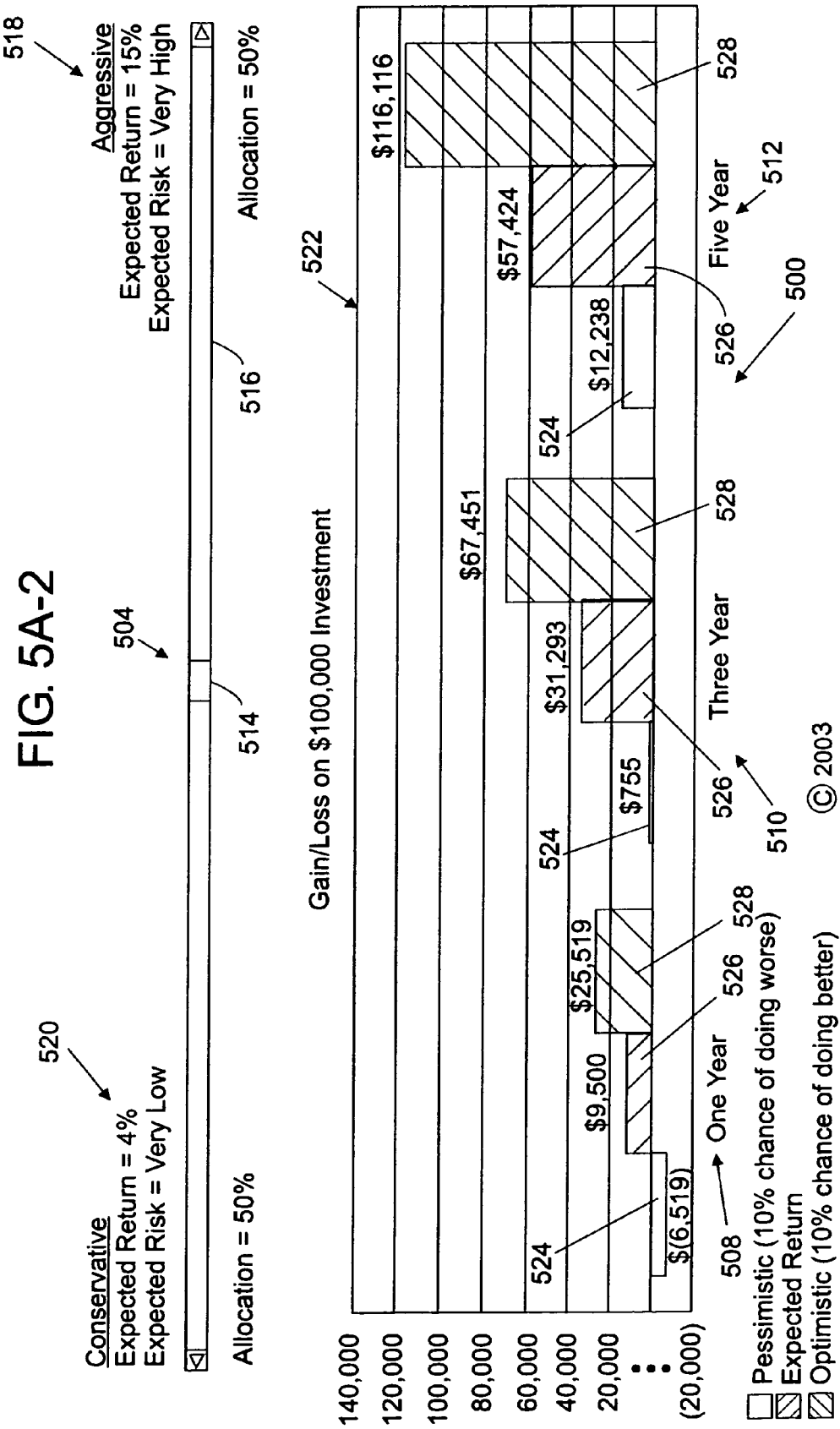
FIGS. 5A and 5B are each an example of a graphical user interface, web page or computer monitor screen to present a hypothetical to evaluate the risk tolerance of a user in accordance with another embodiment of the present invention.
Figures 2, 5B:
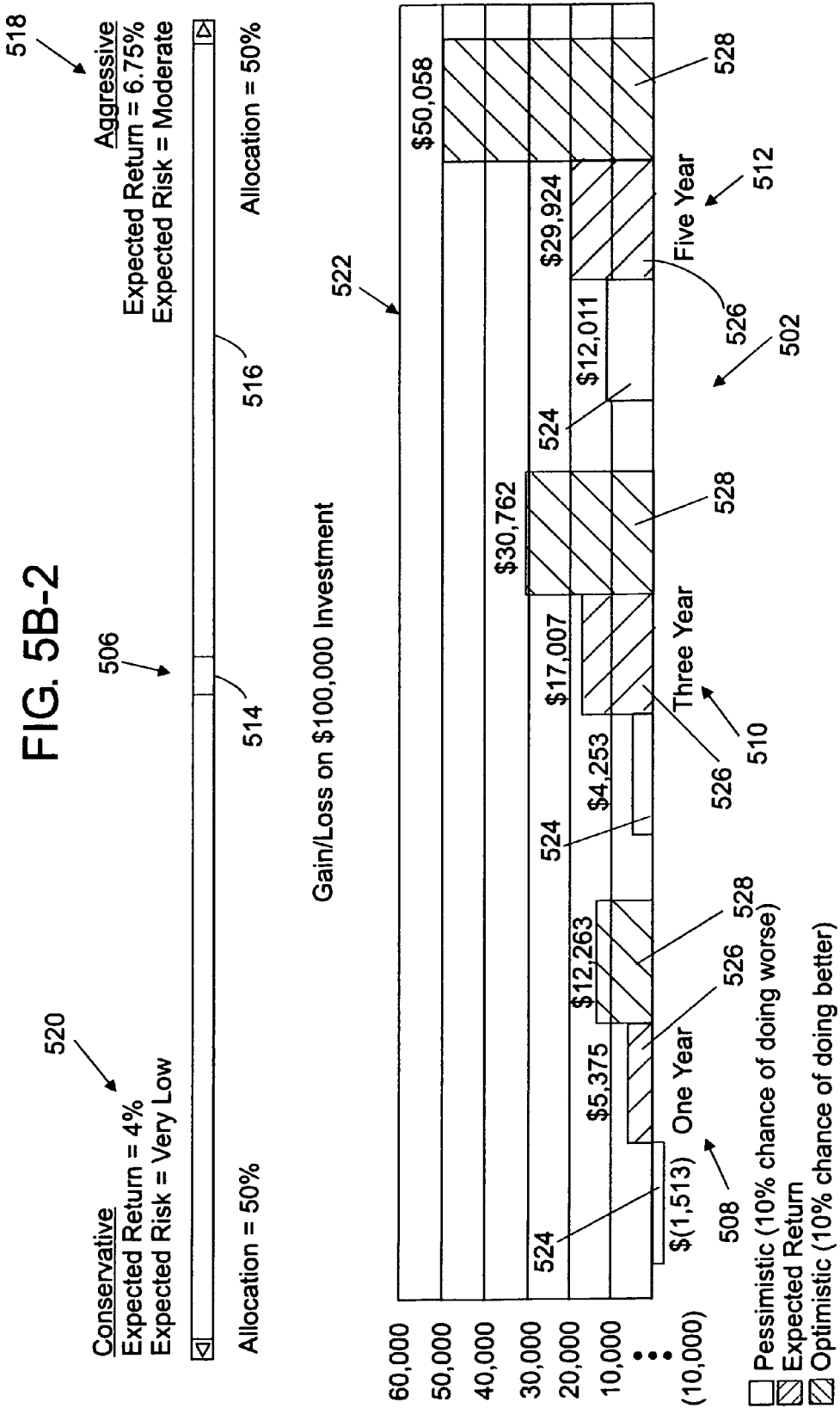

Other examples of the risk tolerance evaluation questions 202 (FIG. 2A) are illustrated in FIGS. 5A and 5B as respective web pages 500 and 502, computer monitor screens or graphical user interfaces. The web pages 500 and 502 may also each present a hypothetical risk tolerance question or portfolio selection 504 and 506 respectively to a user or investor to evaluate the risk tolerance of the user in accordance with another embodiment of the present invention. Each of the web pages 500 and 502 may include instructions 505 to the user how to allocate resources between the two options or hypothetical assets. The web pages 500 and 502 may be similar to the web pages 402 and 414 of FIGS. 4A and 4B except that the returns or expected outcomes may be graphically illustrated for different time periods. The time periods illustrated in the examples in FIGS. 5A and 5B are one year 508, three year 510 and five year 512 periods; although, different periods may be used as well for the hypothetical portfolio selected by the user. The graphical representations 522 may represent pessimistic 524, optimistic 526 or expected 528 outcomes for each of the various time periods. Similar to web pages 402 and 414 (FIGS. 4A and 4B), a slider 514 may be provided in each of pages 500 and 502 that may be moved along a slider bar 516 to permit a user to select a percentage of an aggressive asset 518 relative to a conservative asset 520. As the slider 514 is slid along the slider bar 516, the graphical representations 522 for each of the one year 508, three year 510 and five year 512 outcomes will correspondingly change to represent the change in the portfolio selected by the user. In these examples, the pessimistic is shown as having a 10% of the outcome being equal to or less than the value illustrated in the pessimistic graph 524. The optimistic is shown as having a 10% chance of the outcome being equal to or grater than the value illustrated in the optimistic graph 528. Other percentages, such as 5% or other values, could be used in place of 10%. Standard statistical formulas used in the financial services industry may be used to calculate each of the pessimistic, expected and optimistic outcomes for each time period. A user's risk tolerance can be determined or evaluated in response to the user's selected or accepted percentage of the aggressive asset 518 relative to the conservative asset 520 in each of a plurality of predetermined risk tolerance hypothetical questions as illustrated in FIGS. 5A and 5B.

In one embodiment of the present invention, the introduction and instruction page 300 (FIG. 3) and at least one of the risk tolerance evaluation questions or hypotheticals web pages 400 (FIG. 4A) may be combined as one of a plurality of web pages or screen shots.

A progress meter 302 (FIG. 3) may also be provided to present to a user his progress through the procedure. Each of the blocks or sections 304 of the meter 302 may be shaded or highlighted to indicate the user's progress and a percentage complete may also be displayed. The example web pages or screen shots in FIGS. 4B and 6A-8B illustrate the function of the progress meter 302.

After responding to the risk tolerance questions 202 (FIG. 2A) the user may advance to an attribute selection page or pages 204. An example of the attribute selection page or pages 204 is illustrated in FIGS. 6A-6D as a web page, computer monitor screen, or graphical user interface 600 to present attributes 602 or characteristics related to the alternatives for selection by the user. The screen 600 may include instructions 604 for selecting the attributes. In using the present invention for selecting different investment managers or firms and different investment products, the attributes 602 may be divided into categories related to the investment firm, manager or business, such as business strength 606, the product features 608, the absolute product performance 610 and the market-relative product performance 612. As illustrated in FIG. 6A, examples of firm attributes 606 may include years in business, size of firm by assets, turnover in personnel and so forth. Examples of product features or attributes 608 may include length of time the product has been offered or on the market, managed by a team or individually, team size, socially conscious objective, adherence to specific market style and the like.

Examples of absolute performance attributes 610 may include the annual return for the last 10, 5 and 3 years, worst quarter in last 5 years and total risk or variance the last 5 years. Examples of market-relative product performance attributes 612 may include market relative risk for last 5 and 3 year periods and market-relative risk adjusted return for the last 10 and 5 years, up-market capture and down-market capture and prima performance ranking as illustrated in FIG. 6C. Check boxes 614 may be provided for the user to select those attributes that are important to the user. An investment firm or service providing the method 100 (FIGS. 1A and 1B) may alter the attributes depending upon certain variables, such as demographics of the potential user or investor, types of investment products being offered or evaluated and the like.

An example of an attribute preference order web page or screen 616 is illustrated in FIG. 6D. Some attributes selected by a user may need to be ordered according to the user's preferences to more accurately rank or allocate the different alternatives or products based on the user's selections. The user's preferred order of the attributes may be rearranged by using buttons 618 that may be used to rearrange the attributes. The buttons 618 may be activated by a mouse or pointing device of a computer system on which the web page 616 is being displayed.

From the attribute selection web pages or screens 204 (FIG. 2A), the user may advance to the importance of difference ratings pages or screens 206 (FIG. 2B). FIGS. 7A and 7B illustrate an example of the importance of difference pages 206 as a graphical user interface, web page or computer monitor screen or screens 700. The screens 700 present importance of difference rating questions 702 to the user for selection of a degree of importance of the difference between a first hypothetical 704 for an attribute paired with a second hypothetical 706 for the same attribute. A pair of hypotheticals 704 and 706 may be presented for each attribute previously selected by the user in FIG. 6 for the user to select an importance of difference between the paired hypothetical attribute values or settings. As illustrated in FIGS. 7A and 7B, the first hypothetical 704 may have a first predetermined value or setting and the second hypothetical 706 may have a second predetermined value or setting substantially higher than the first predetermined value or setting. Accordingly, the first hypothetical 704 may have a relatively low value or setting or be a worst case scenario and the second hypothetical 706 may have a relatively high value or setting or be a best case scenario compared to the first hypothetical 704. The user is then asked to select the importance of difference for him between the first hypothetical attribute value 704 and the second hypothetical attribute value 706 by checking a box, circle or radio button 708. As shown in FIGS. 7A and 7B, the importance of differences may range from extremely important, very important, important, somewhat important to not important. The importance of difference hypotheticals may be formed or generated on the fly depending upon the attributes selected by the user and the user's responses to the hypotheticals.

After selecting the degree of importance of difference for the paired hypothetical attribute values on pages 206, the user may advance to one or more trade-off questions pages or screens 208 (FIG. 2B). Examples of the trade-off questions pages 208 are illustrated in FIGS. 8A and 8B as graphical user interfaces, web pages, or computer monitor screens 800 to present a series of trade-off questions 802. The trade-off questions 802 are presented to the user to select a degree of preference between a first pair of hypothetical attribute values or settings 804 and a second pair of hypothetical attribute values or settings 806 in each trade-off question 802. In each trade-off question or hypothetical set 802, the first pair of hypotheticals 804 may include a first hypothetical 808 having a predetermined value or setting of one attribute and a second hypothetical 810 having a predetermined value or setting of another attribute. The second pair of hypotheticals 806 in each trade-off question or hypothetical set 802 may include a third hypothetical 812 and a fourth hypothetical 814. The third hypothetical 812 may have another predetermined value or setting of the one attribute that may be substantially higher or lower than the predetermined value or setting of the first hypothetical 808. The fourth hypothetical 814 may have another predetermined value of the other attribute that may be substantially lower or higher than the predetermined value of the second hypothetical 810. In summary, in each trade-off question, a user is asked to select a degree of preference between a first pair of hypotheticals 804 and a second pair of hypotheticals 806. The first pair of hypotheticals 804 may include a relatively low value hypothetical of one attribute paired with a relatively high value hypothetical of another attribute. The second pair of hypotheticals may include a relatively high value hypothetical of the one attribute paired with a relatively low value hypothetical of the other attribute. The user may select a degree of preference between strongly prefer left or the first pair of hypotheticals 804 on the left 816, no preference 818 in the middle, to strongly prefer right or the second pair of hypotheticals 806 on the right 820 of the web page 800. The user may select by marking or clicking on a circle 822, box, radio button or the like. The trade-off questions may also be generated on the fly as a function of how the user responds to the importance of difference ratings.

After the user has selected his preference for each trade-off question on pages 208 (FIG. 2B) the user may advance to a personal preference weighting page or screen 210. An example of the personal preference weighting page 210 may be illustrated in FIG. 9 as personal preference weighting web page 900. The weighting web page 900 may present to the user a weighting scale, a slider 901 in a slider bar 902 or the like for the user to allocate a percentage of weighting between the risk tolerance evaluation from the user's responses to the risk tolerance questions on web pages 202 (FIG. 2A) and the analysis of preferences of the attributes, importance of differences and trade-off preferences selected by the user in pages 204, 206 and 208 (FIGS. 2A and 2B). The user may allocate the percentage of weighting using a pointing device, such as a mouse or the like. The investment management firm, investment service or other entity providing the selection method 100 (FIGS. 1A and 1B), may limit the percentage of weighting that can be allocated by the user in FIG. 9. Alternatively, the firm or service may preselect the weighting for the user or investor or select the weighting for the user or investor based on criteria established by the firm or service. Accordingly, the method 100 is flexible and the investment service or management firm may modify the method 100 (FIGS. 1A and 1B) to fit different criteria and investment alternatives.

After selecting a weighting on page 210, the combined preference results may be presented to the user in a graphical user interface, computer screen or web page 212 (FIG. 2C). An example of a combined results web page 212 is illustrated in FIG. 10 as combined results web page 1000 or the like. The alternatives or investment manager/products 1002 may be presented to the user in descending order according to how well each alternative 1002 matches the user's risk tolerance and preferences combined. The name of each plan or manager/product 1002 may be listed in one column 1004 and an alternative or manager/product preference score or a measure of how well each alternative or manager/product 1002 matched the user's preferences may be indicated in another column 1006. The preference score may be illustrated for each manager/product by a bar graph 1010. A numerical score or preference ratings number or the like may also be displayed. The page or screen 1000 may also include an explanation of the results 1014.

Referring back to FIG. 2C, after the combined preference results are presented to the user in page 212, the user may advance to a comparison selection page 214. On the comparison selection page 214, the user may select two or more alternatives or available manager/products for comparison. An example of the comparison selection page 214 (FIG. 2C) may be a graphical user interface, web page or computer monitor screen 1100 illustrated in FIGS. 11A and 11B. The web page 1100 may be used to present the alternatives or manager/products 1102 previously ranked for the user in web page 1000 (FIG. 10) and to present the attributes 1104 (FIG. 11B) for selection by the user for comparison or allocation of the alternatives or manager/products 1102 by attribute 1104. A web site link may be provided for each manager/product 1102 to provide the user additional information regarding each manager/product 1102. A mouse or pointing device may be used to click on the name of the manager/product 1102 for which the user wants more information to activate the link. A box 1110, radio button or the like may be associated with each manager/product 1102 that can be marked or checked by the user to select that manager/product 1102 for comparison. A box 1111, radio button or the like may also be associated with each attribute 1104 that can be marked or checked by the user to select that attribute 1104 for comparison. Those attributes 1104 that where marked or checked on page 204 (FIG. 2A) as important may be identified on page 1100 by an asterisk 1112, highlighting in a selected color, such as red, or the like. Page 1100 may also include instruction 1114 (FIG. 11A) to select the manager/products for comparison and instructions 1116 (FIG. 11B) to select the attributes for comparison.

FIG. 11C is an example of a web page 1118 to select attributes or products for filtering. This will reduce the number of products, managers or funds displayed that match the users preferences to aid in the selection and evaluation process.

The comparison results for the manager/products 1102 and attributes 1104 selected on web page 1100 or 214 (FIG. 2C) may be presented to the user on web page 216. An example of the web page 216 is illustrated as the comparison results web page, graphical user interface, or screen 1200 in FIG. 12. The comparison results web page 1200 may include an explanation 1202 of the results and a table 1204 including manager/product details based on the user selections on page 1100 (FIGS. 11A, 11B and 11C). The table 1204 may include column headings: "Attribute Category" 1206, "Attribute" 1208 and an identification 1210 for each manager/product selected by the user in page 1100. The comparison information may be organized in table 1200 in rows by categories. The row headings may include "Business Strength "1212," Product Features 1214, "Absolute Product Performance" 1216 and "Market-Relative Product Performance" 1218. The "Attribute" column 1208 may contain the attribute terms selected by the user on page 1100 (FIG. 11B). The attributes previously selected by the user on page 600 (FIG. 6A-6D) or page 204 (FIG. 2A) may be indicated by highlighting in a selected color or otherwise identified in column 1208. Additionally, each of the attribute terms in column 1208 may be linked to a more complete definition of the attribute term. The comparison results page 1200 may include a link 1220 to return to the "Comparison Module Page" 1100 (FIGS. 11A, 11B and 11C) or page 214 (FIG. 2C) to permit the user to select other manager/products for comparison. The page 1200 may also include a link to return the process to the "Risk Tolerance Preference Introduction" page 300 (FIG. 3) or page 200 (FIG. 2A) to begin the selection process again.

Figure 14:
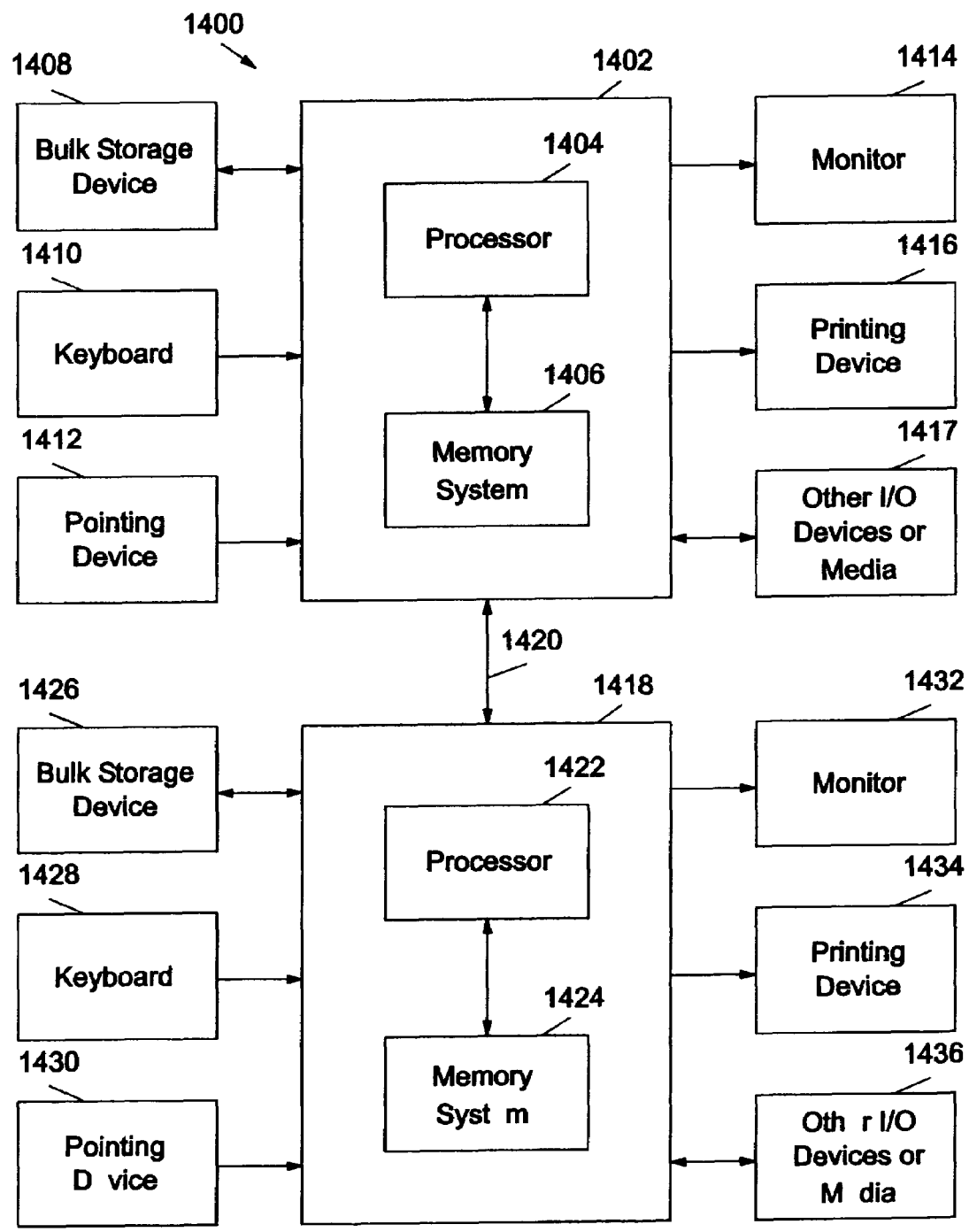
FIG. 14 is an example of a system for selecting alternatives, allocating resources among alternatives or both in accordance with an embodiment of the present invention.

FIG. 14 is an example of a system 1400 for selecting alternatives, allocating resources or the like among alternatives or both in accordance with another embodiment of the present invention. The system 1400 may include a computer system 1402, or the like. The computer system 1402 may include a processor 1404 and a memory system 1406. The memory system 1406 may include a software program containing computer readable instructions for performing the method of the present invention, such as method 100 shown in FIGS. 1A and 1B. The processor 1404 may perform the method 100 including calculating the utilities for each alternative as a function of user risk tolerance and historical data or returns as provided in block 106 of FIG. 1A. Additionally, the processor 1404 may be adapted or programmed to perform analysis, such as conjoint analysis, analytical hierarchical process (AHP) or the like, as previously described, to evaluate the user's selection of attributes in block 110 and the user's responses to the importance of difference questions and trade-off questions in blocks 112 and 114 of FIG. 1A.

The computer 1402 may be coupled to a bulk storage device 1408 to store a portion or all of the software programs and data base information, such as historical information or the like, for the different alternatives needed to perform the method of the present invention, such as the method 100. A keyboard 1410 and pointing device 1412 may also be provided to facilitate the user selecting different items, such as attributes, preferences to hypotheticals, moving sliders in slider bars, responding to other inquiries that may be part of the process or method and the like. The computer 1402 may also be connected to a monitor 1414 to present the different web pages or screen shots to the user, as described in detail above, and the computer 1402 may be connected to a printing device 1416 to print any results from the method 100. The computer system 1402 may also be coupled to other input devices, such as disk drives or the like, or other media 1417 to receive or download computer-usable or computer-executable instructions such as the method 100. The computer 1402 may also be coupled with import devices or media 1417 to receive or download computer-usable or computer-executable instructions such as method 100.

The system 1400 may also include a remote computer or server 1418 or the like on which a method in accordance with the present invention similar to the method 100 of FIGS. 1A and 1B may reside rather than on a local computer, such as computer 1402. The user may then access the method 100 via a communications link or medium 1420. The communications link or medium 1420 may be a network, such as the Internet, private network, a wide area network (WAN), a local area network (LAN), wireline, wireless communication or the like. The server 1418 may include a processor 1422 and memory system 1424. Peripheral equipment, such as a bulk storage device 1426, keyboard 1428, pointing device 1430, monitor 1432, printing device 1434, other import devices 1436 or the like may also be associated with the remote computer or server 1418. The other import or input devices 1436 may be an electronic, magnetic, optical, electromagnetic, infrared, or semiconductor device, such as disk drive, CD-ROM drive, DVD drive or the like. The input devices or media 1436 may receive or download computer-usable or computer readable instructions such as the method 100 and corrections or updates thereto. The server 1418 may be accessed by multiple computers or systems similar to computer 1402 so that multiple users may access the method 100 simultaneously.

The method 100 (FIG. 1) may be embodied in a computer readable medium or electronic readable medium, such as memory system 1406, bulk storage device 1408 or other I/O devices or media 1417 or 1436 (FIG. 14) or the like, having computer-executable instructions for performing the method 100. Examples for the media 1417 and 1436 may be or form part of a communication channel, memory or similar devices. The media 1417 and 1436 may be any medium that may contain, store, communicate or transport the data embodied thereon for use by or in connection with the system 1400. The media 1417 and 1436 may, for example, be an electronic, magnetic, optical, electromagnetic, infrared or semiconductor system or the like. The medium may also be simply a stream of information being retrieved when the data is "downloaded" through a network such as the Internet.

Figure 15:
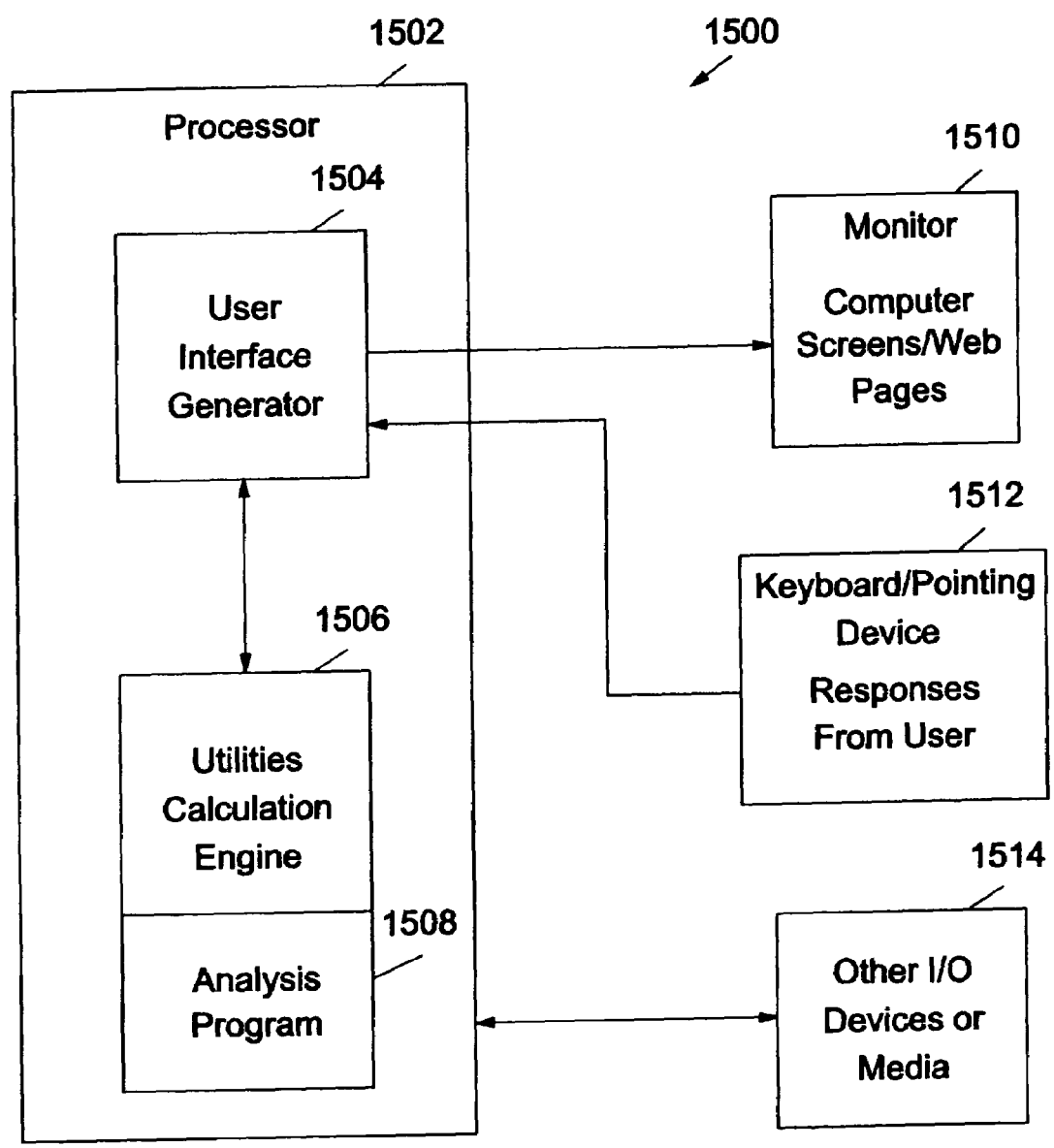
FIG. 15 is an example of another system for selecting alternatives, allocating resources among alternatives or both in accordance with another embodiment of the present invention.

FIG. 15 is an example of another system 1500 for selecting alternatives, allocating resources or the like among alternatives or both in accordance with another embodiment of the present invention. The system 1500 may form part of the system 1400 of FIG. 14 or may be part of the server 1418. The system 1500 may include a processor 1502 or the like. The processor 1502 may include a user interface generator 1504 and a utilities calculation engine 1506. The utilities calculation engine 1506 may be operatively associated with the user interface generator 1504. The user interface generator 1504 may be adapted to present a plurality of risk tolerance questions to a user; receive responses from the user to the risk tolerance questions, similar to risk tolerance questions 402 and 502 in FIGS. 4 and 5. The user interface generator 1504 may also present a plurality of attributes related to the plurality of alternatives, similar to attributes 602 in FIG. 6. The user interface generator 1504 may also receive responses from the user relative to questions related to the attributes, similar to the series of importance of difference questions 702 in FIGS. 7A and 7B and series of trade-off questions 802 in FIGS. 8A and 8B.

The utilities calculation engine 1506 may be adapted to determine a risk tolerance for the user based on responses from the user to the risk tolerance questions. The utilities calculation engine 1506 may also analyze responses from the user to the questions related to the attributes, such as the importance of difference and trade-off questions previously discussed. The utilities calculation engine 1506 may also rank the alternatives or allocate resources, funds or the like in response to a combination of the risk tolerance of the user and analysis of the attributes as previously described.

The utilities calculation engine 1506 may include an analysis program 1508, such as a conjoint analysis program, AHP program or the like. The analysis program 1508 may be adapted or programmed to analyze the responses from the user to the questions related to the attributes and to rank the alternatives, allocate resources or the like among the alternative or both in response to the conjoint, AHP or similar analysis.

The system 1500 may also include peripheral equipment, such a monitor 1510 and a keyboard/pointing device 1512 and the like. The system 1500 may also be coupled to other input devices or media 1514 to receive or download information, data or computer-usable or computer executable instruction. The system 1500 may also be coupled to other input devices 1514, such as disk drives, or other media to receive or download computer-usable or computer-executable instructions such as the method 100 of FIG. 1 or the like. The monitor 1510 may present the computer screens or web pages, similar to those described above, and the keyboard/pointing device 1512 may facilitate the user selecting and responding to inquiries associated with the method 100 (FIGS. 1A and 1B) and the web pages described above.

The user interface generator 1504 and the utilities calculation engine 1506 may include computer programs adapted to be executed on a computer local to the user, such as computer 1402 in FIG. 14 or remote to the user, such as computer 1418 in FIG. 14.

Elements of the present invention may be embodied in hardware and/or software as a computer program code that may include firmware, resident software, microcode or the like. Additionally, elements of the invention may take the form of a computer program product on a computer-usable or computer-executable storage medium, such as memory systems 1406 and 1424 or media 1417 and 1436 in FIG. 14 or media 1514 in FIG. 15, having computer-usable or computer-executable program code embodied in the medium for use by or in connection with a system, such as system 1400 of FIG. 14 or system 1500 of FIG. 15. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-readable medium having computer-executable instructions for performing a method for selecting between a plurality of investment alternatives, the method comprising:
   determining a risk tolerance for a user;
   presenting a plurality of attributes for selection by the user;
   selecting a relative importance for each of the selected attributes;
   selecting a degree of preference for each of the selected attributes with respect to at least one other of the selected attributes;
   determining a quantitative value of importance of each of the selected attributes relative to the other selected attributes based upon both the relative importance and the degree of preference for each of the selected attributes; and
   generating a ranking of the investment alternatives in response to an analysis of the quantitative value of importance of each of the selected attributes and the risk tolerance of the user.

2. The computer-readable medium having computer-executable instructions for performing the method of claim 1, wherein determining the risk tolerance of the user comprises evaluating responses by the user to a plurality of risk tolerance questions.

3. The computer-readable medium having computer-executable instructions for performing the method of claim 1, wherein determining the risk tolerance of the user comprises presenting at least one portfolio including a risky asset and a riskless asset for user selection of an acceptable percentage of one of the risky asset or the riskless asset relative to the other.

4. The computer-readable medium having computer-executable instructions for performing the method of claim 1, further comprising calculating a utility for each of the plurality of investment alternatives as a function of the risk tolerance of the user and information associated with each of the plurality of investment alternatives.

5. The computer-readable medium having computer-executable instructions for performing the method of claim 1, further comprising:
   presenting a series of importance of difference rating questions related to the attributes selected by the user; and
   presenting a series of trade-off questions based on responses of the user to the series of importance of difference rating questions; wherein
   the step of determining a quantitative value of importance for each selected attribute is based at least in part on responses of the user to the series of trade-off questions.

6. The computer-readable medium having computer-executable instructions for performing the method of claim 1, further comprising presenting the investment alternatives ranked in an order of a combination of a highest utility to a lowest utility in response to analysis of the plurality of attributes and the highest certainty equivalent to lowest certainty equivalent in response to the risk tolerance of the user.

7. The computer-readable medium having computer-executable instructions for performing the method of claim 1, further comprising presenting the investment alternatives ranked in an order of a weighting between a highest utility to a lowest utility in response to analysis of the plurality of attributes and a highest certainty equivalent to a lowest certainty equivalent in response to the risk tolerance of the user.

8. The computer-readable medium having computer-executable instructions for performing the method of claim 7, wherein the weighting is selected by the user.

9. The computer-readable medium having computer-executable instructions for performing the method of claim 7, wherein the weighting is selected by one other than the user.

10. The computer-readable medium having computer-executable instructions for performing the method of claim 1, further comprising presenting the ranked investment alternatives for selection for comparison by the user.

11. The computer-readable medium having computer-executable instructions for performing the method of claim 1, further comprising performing one of conjoint analysis or analytic hierarchical processing using attributes selected by the user to determine a user's preferences related to the investment alternatives.

12. The computer-readable medium having computer executable instructions for performing the method of claim 1 further comprising allocating resources among the investment alternatives based on the ranking of the investment alternatives.

13. A system for selecting between or allocating among a plurality of investment alternatives, comprising:
   a user interface generator that presents a plurality of attributes related to the plurality of investment alternatives for the user to select those attributes of importance to the user and to present a plurality of questions to the user;
   an analysis program that determines, based on responses to the plurality of questions, a risk tolerance of the user, a relative importance for each selected attribute, and a degree of preference for each selected attribute with respect to at least one other selected attribute, wherein the analysis program determines a quantitative value of importance for each selected attribute relative to the other selected attributes based on both the relative importance and the degree of preference for each selected attribute; and
   a processor programmed to generate a ranking of the investment alternatives in response to a combination of the risk tolerance of the user and the quantitative value of importance of each selected attribute.

14. The system of claim 13, where the plurality of questions further comprises a plurality of risk tolerance questions, wherein the user interface generator presents the plurality of risk tolerance questions to the user and the analysis program determines the risk tolerance of the user by evaluating responses by the user to the plurality of risk tolerance questions.

15. The system of claim 13, further comprising at least one portfolio including a risky asset hypothetical and a riskless asset hypothetical, wherein the user interface generator presents the at least one portfolio for the user to select an acceptable percentage of the risky asset relative to the riskless asset, and wherein the analysis program determines the risk tolerance of the user in response to the acceptable percentage selected by the user.

16. The system of claim 13, wherein the processor calculates a certainty equivalent for each of the plurality of investment alternatives as a function of the risk tolerance of the user and information associated with each of the plurality of investment alternatives.

17. The system of claim 13, wherein the plurality of questions comprises a series of importance of difference questions related to the selected attributes, wherein the user interface generator presents each of the series of importance of difference questions for response by the user.

18. The system of claim 13, further comprising a first hypothetical paired with a second hypothetical related to each attribute selected by the user, wherein the user interface generator presents each of the paired hypotheticals for the user to select a degree of importance of difference between the first hypothetical and the second hypothetical.

19. The system of claim 13, wherein the plurality of questions comprises a series of trade-off questions related to the attributes selected by the user, wherein the user interface generator presents each of the series of trade-off questions for response by the user.

20. The system of claim 13, wherein the plurality of questions comprises a plurality of sets of hypotheticals, each set of hypotheticals including a first pair of hypotheticals associated with a second pair of hypotheticals, wherein the user interface generator presents each set of hypotheticals for the user to select a degree of preference between the first pair of hypotheticals and the second pair of hypotheticals.

21. The system of claim 13, further comprising a weighting scale, wherein the user interface generator presents the weighting scale for the user to allocate a percentage of weighting between the risk tolerance and preferences from the conjoint analysis.

22. The system of claim 13, wherein the user interface generator presents the ranked investment alternatives for the user to select investment alternatives for comparison.

23. The system of claim 13, wherein the analysis program comprises computer-executable instructions to perform one of a conjoint analysis or an analytic hierarchical process.

24. The system of claim 13, wherein the processor is programmed to allocate resources among the investment alternatives based on the ranking of the investment alternatives.

25. A system for selecting between or allocating among a plurality of investment alternatives, comprising:
    a user interface generator that:
        presents a plurality of risk tolerance questions to a user;
        presents a plurality of attributes related to the plurality of investment alternatives for the user to select attributes of importance to the user; and
        presents a plurality of questions related to the selected attributes; and
    a utilities calculation engine operatively associated with the interface generator that:
        determines a risk tolerance for the user based on responses from the user to the risk tolerance questions,
        determines a relative importance for each selected attribute based on responses to a first set of the plurality of questions related to the selected attributes,
        determines a degree of preference for each selected attribute with respect to at least one other selected attribute based on responses to a second set of the plurality of questions related to the selected attributes,
        determines a quantitative value of importance for each selected attribute relative to the other selected attributes based on both the relative importance and the degree of preference for each selected attribute, and
        generates a ranking of the investment alternatives in response to a combination of the risk tolerance of the user and an analysis of the quantitative values of importance.

26. The system of claim 25, wherein the utilities calculation engine comprises one of a conjoint analysis program and an analytic hierarchical process ("AHP") that analyzes responses from the user to the plurality of questions related to the attributes and to at least one of rank the investment alternatives or allocate among the investment alternatives in response to one of conjoint analysis or AHP.

27. The system of claim 25, wherein the plurality of questions related to the selected attributes comprise:
    a series of importance of difference rating questions related to the selected attributes, wherein the user interface generator presents each of the series of importance of difference rating questions for response by the user; and
    a series of trade-off questions based on responses of the user to the series of importance of difference rating questions, wherein the user interface generator presents each of the series of trade-off questions for response by the user.

28. The system of claim 25, wherein the user interface generator and the utilities calculation engine comprise computer programs executed on a computer local to the user.

29. The system of claim 25, wherein the user interface generator and the utilities calculation engine comprise computer programs executed on a computer remote to the user.

30. The system of claim 29, wherein the user may be coupled to the remote computer or server by an Internet connection, wide area network, local area network, wire line or wireless connection.

31. The system of claim 25, wherein the utilities calculation allocates resources among the investment alternatives based on the ranking of the investment alternatives.

* * * * *